(12) United States Patent
Imagawa et al.

(10) Patent No.: US 7,397,931 B2
(45) Date of Patent: Jul. 8, 2008

(54) HUMAN IDENTIFICATION APPARATUS AND HUMAN SEARCHING/TRACKING APPARATUS

(75) Inventors: Taro Imagawa, Hirakata (JP); Masahiro Iwasaki, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 411 days.

(21) Appl. No.: 11/342,651

(22) Filed: Jan. 31, 2006

(65) Prior Publication Data

US 2006/0120564 A1 Jun. 8, 2006

Related U.S. Application Data

(63) Continuation of application No. PCT/JP2005/013769, filed on Jul. 27, 2005.

(30) Foreign Application Priority Data

Aug. 3, 2004 (JP) ............................. 2004-227083

(51) Int. Cl.
*G06K 9/00* (2006.01)
(52) U.S. Cl. .................... 382/103; 340/541; 340/573.7; 348/155; 382/190; 382/291; 600/595; 715/723
(58) Field of Classification Search ................ 340/541, 340/573.7; 348/155; 382/103, 190, 291; 600/595; 715/723
See application file for complete search history.

(56) References Cited

U.S. PATENT DOCUMENTS 5,885,229 A * 3/1999 Yamato et al. .............. 600/592
6,542,621 B1 * 4/2003 Brill et al. .................. 382/103

(Continued)

FOREIGN PATENT DOCUMENTS

JP 04-033066 2/1992

(Continued)

OTHER PUBLICATIONS

Sourabh A. Niyogi et al., entitled *"Analyzing and Recognizing Walking Figures in XYT"*, M.I.T. Media Lab Vision and Modeling Group Technical Report No. 223, 1994.

*Primary Examiner*—Gregory M Desire
(74) *Attorney, Agent, or Firm*—Wenderoth, Lind & Ponack, L.L.P.

(57) ABSTRACT

A human identification apparatus, which can judge for identification of human images even in temporally-distant frames or frames shot with different cameras, judges whether or not persons represented by human images respectively included in different image sequences are the same person, and includes: a walking posture detecting unit which detects first and second walking sequences, each sequence being an image sequence indicating a walking state of respective first and second persons respectively included in the different image sequences; and a walking state estimating unit which estimates a transition state of a walking posture in the periodic walking movement of the first person at a time or in a position different from a time or a position of the walking sequence of the first person; and a judging unit which verifies whether or not the estimated transition state of the walking posture of the first person matches the transition state of the walking posture of the second person, and judges that the first person and the second person are the same person in the case where the transition states match with each other.

5 Claims, 19 Drawing Sheets

U.S. PATENT DOCUMENTS

| | | | |
|---|---|---|---|
| 6,958,045 B2 * | 10/2005 | Takiguchi et al. | 600/595 |
| 7,113,185 B2 * | 9/2006 | Jojic et al. | 345/420 |
| 7,116,323 B2 * | 10/2006 | Kaye et al. | 345/420 |
| 7,265,777 B2 * | 9/2007 | Chen et al. | 348/155 |
| 2002/0167403 A1 * | 11/2002 | Colmenarez et al. | 340/541 |
| 2004/0252861 A1 * | 12/2004 | Watanabe | 382/103 |
| 2005/0192516 A1 * | 9/2005 | Takiguchi et al. | 600/595 |
| 2006/0093188 A1 * | 5/2006 | Blake et al. | 382/103 |
| 2006/0120564 A1 * | 6/2006 | Imagawa et al. | 382/103 |
| 2007/0104383 A1 * | 5/2007 | Jojic et al. | 382/254 |
| 2007/0211925 A1 * | 9/2007 | Aoki et al. | 382/118 |

FOREIGN PATENT DOCUMENTS

| | | |
|---|---|---|
| JP | 2000-182060 | 6/2000 |
| JP | 2003-346159 | 12/2003 |

* cited by examiner

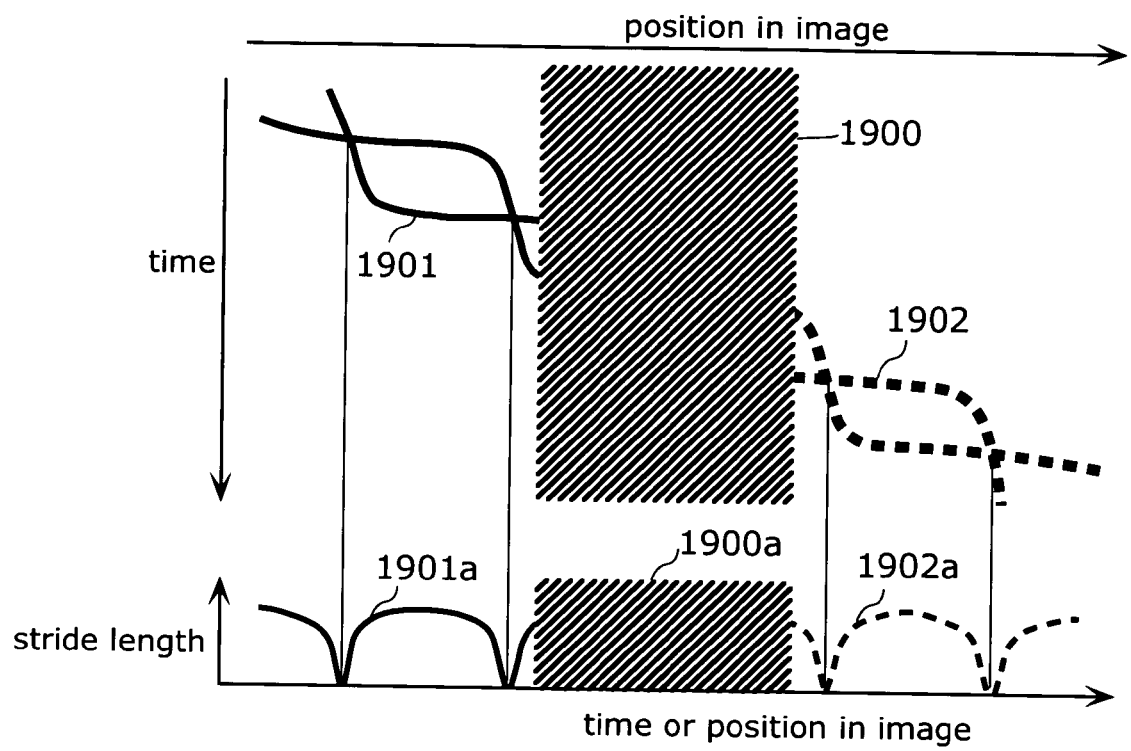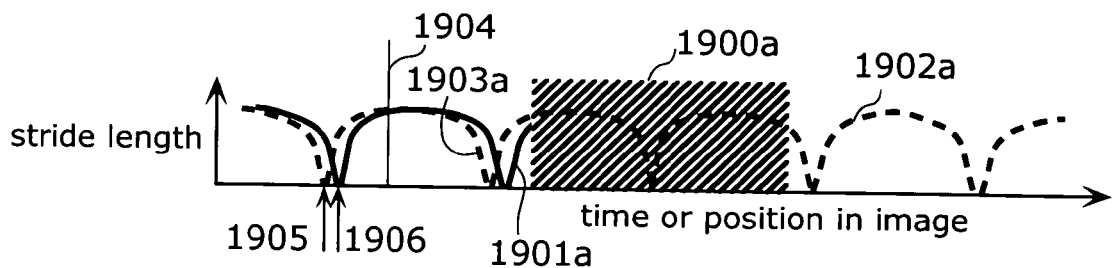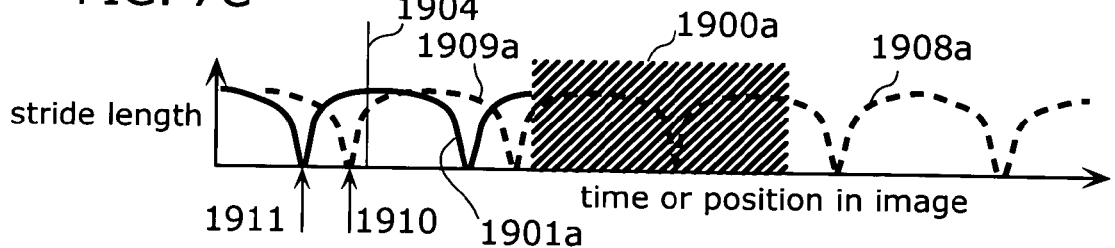

FIG. 9

| Sequence number | Spatiotemporal period information | Spatiotemporal phase information | Spatiotemporal position information | Matched sequence number |
|---|---|---|---|---|
| 1 | (1.5, 1.8) | (0.5, 0.1) | 14:00:42 (110, 20) | 3 |
| 2 | (1.9, 1.7) | (0.9, 0.5) | 15:10:11 (109, 19) | 0 |
| 3 | (1.5, 1.7) | (0.5, 0.2) | 14:01:05 (150, 35) | 1 |

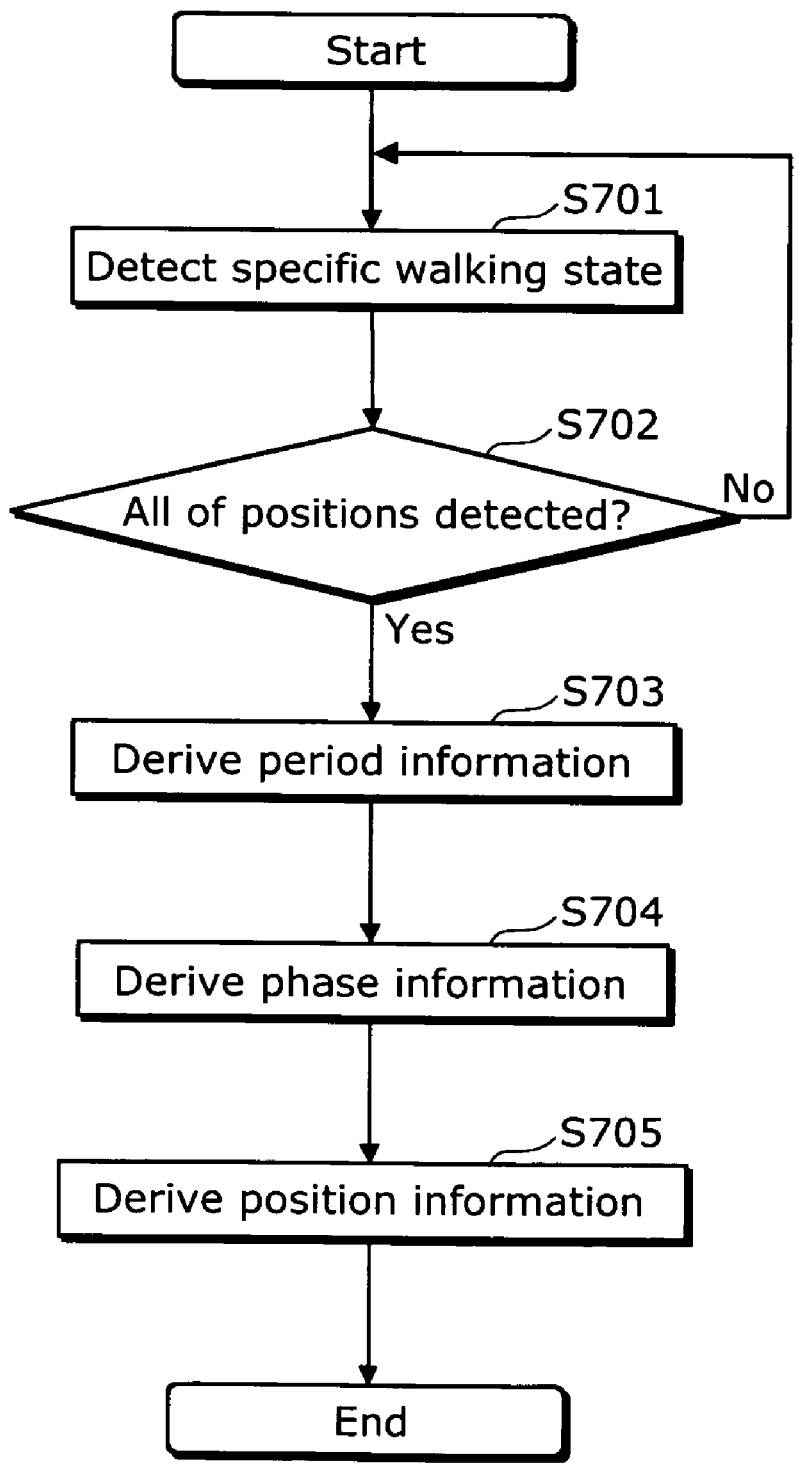

HUMAN IDENTIFICATION APPARATUS AND HUMAN SEARCHING/TRACKING APPARATUS

CROSS REFERENCE TO RELATED APPLICATION

This is a continuation application of PCT application No. PCT/JP05/013769 filed on Jul. 27, 2005, designating the United States of America.

BACKGROUND OF THE INVENTION (1) Field of the Invention

The present invention relates to a human identification apparatus which judges whether or not a human image included in one image sequence and a human image included in another image sequence represent the same person, and an apparatus which searches for or tracks a person.

(2) Description of the Related Art

In order to search for or track a specific person in an image sequence obtained by a surveillance camera, it is required to identify the specific person, namely, to judge whether or not a person that appears in one image or image sequence is as same as a person that appears in another image or image sequence.

One of the conventional methods for judging a person for identification with the view to searching for or tracking a person represented by a human image in an image sequence is to correspond human image areas in the neighboring frames (for example pp. 3 and 6 and FIGS. 2 and 9, in the Japanese Laid-Open Application No. 2003-346159).

FIGS. 1A through 1C are diagrams for describing the searching/tracking method described in the above-mentioned Application No. 2003-346159. FIGS. 1A and 1B shows temporally consecutive frame images which are obtained by shooting a person. The frame image A10 shown in FIG. 1A is an image obtained by shooting a person A11 who moves toward right. A rectangle A12 is a circumscribed rectangle including head and body of the person which are detected, using motion vectors, as areas with small movement (i.e. steady human area) in the whole body. Similarly, in a frame image A20 shown in FIG. 1B, a circumscribed rectangle A22 of the steady human area detected from a person A21 is presented in a dashed line. In a frame image A30 shown in FIG. 1C, the steady human areas of the circumscribed rectangles A12 and A22 obtained respectively from the frame images A10 and A20 are displayed at the same time in such a way that they overlap with each other. According to the conventional method, the person A11 and the person A21 are identified as the same person based on how the circumscribed rectangles A12 and A22 overlap as well as a continuity of respective motion vectors.

However, the conventional method, in which a person is searched in positions that are close between the frames, has a problem that, in the case where a detection of the person once fails in a certain frame, it becomes impossible to identify a human image in a frame prior to the failed frame with a human image in a frame following the failed frame, so as to track the person.

With the same method, it is conceivable to identify a human image in one frame with a human image in another frame, using colors and image patterns. Other problems, however, are that a positional change increases due to a movement of a person in the case of using temporally distant frames, and that changes of a direction in which the person stands with respect to a camera, a posing of the person and lighting conditions render it difficult to correspond the human image in one frame with the human image in another frame, even though the persons are the same person.

Therefore, in the case where plural persons appear in an image, when a person to be searched for or tracked is hidden behind another person or an object, or when a normal detection cannot be temporarily carried out in a frame due to changes in the lighting conditions, a problem is that it is no longer possible to continue the search or tracking.

SUMMARY OF THE INVENTION

The present invention is therefore conceived in order to solve the conventional problems as described above. An object of the present invention is to provide a human identification apparatus which can judge whether or not persons represented by human images respectively included in temporally-distant frames or frames shot with different cameras are the same person, as well as a human searching/tracking apparatus for searching for or tracking a person, with the use of such human identification apparatus.

In order to achieve the above object, the human identification apparatus of the present invention judges whether or not persons represented by human images respectively included in different image sequences, are the same person, and includes: an image sequence receiving unit which receives inputs of a first image sequence and a second image sequence which is obtained at a time different from a time when the first image sequence is obtained or by an image sensor different from an image sensor used for obtaining the first image sequence; a walking sequence extracting unit which extracts, from the respective inputted first and second image sequences, first and second walking sequences, each being an image sequence indicating a walking state of a person; a gait information extracting unit which extracts first and second gait information, each being information which specifies a periodic motion in human gait, based on the respective extracted first and second walking sequences; a gait information verifying unit which verifies between the extracted first gait information and the extracted second gait information; and a judging unit which judges whether or not the persons represented by the human images respectively included in the first and second image sequences are the same person, based on a result of the verification performed by the gait information verifying unit. The gait information here may be, for instance, information indicating a temporal or spatial walking period of a person, or temporal or spatial phase information regarding periodic walking movement of a person, or temporal or spatial position information indicating periodic walking movement of a person.

According to the present invention, it is possible to verify between human image sequences respectively obtained from temporally-distant frames or with different sensors, by using spatiotemporal period information, spatiotemporal phase information and spatiotemporal position information which can be obtained based on human gait.

In other words, it is possible to provide a human identification apparatus which can judge whether or not persons represented by the human images that are respectively obtained from the temporally-distant frames or the frames shot by different cameras are the same person, and a human searching/tracking apparatus which searches for or tracks a person using such human identification apparatus.

For further information about technical background to this application, the disclosure of Japanese Patent Application No. 2004-227083 filed on Aug. 3, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7A shows an example of a relationship between a walking trace and a change in stride length, according to the first embodiment;

FIG. 7B shows an example of the change in stride length, according to the first embodiment of the present invention;

FIG. 7C shows another example of the change in stride length, according to the first embodiment of the present invention;

FIG. 9 shows an example of a storage format obtained as a result of searching/tracking the walking sequence, according to the first embodiment of the present invention;

FIG. 15 is a flowchart showing an example of a procedure for extracting spatiotemporal period information, spatiotemporal phase information and spatiotemporal position information, according to the first embodiment of the present invention;

DESCRIPTION OF THE PREFERRED EMBODIMENT(S)

Figure 1A:
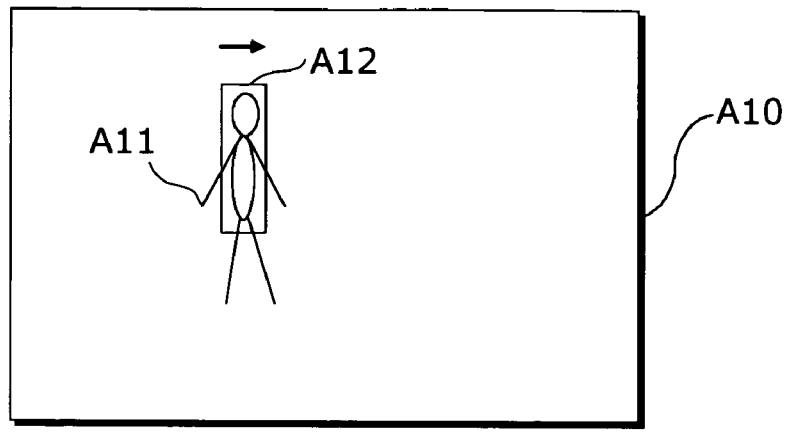
FIG. 1A shows an example of a rectangle area detected by a conventional human searching/tracking apparatus.
Figure 1B:
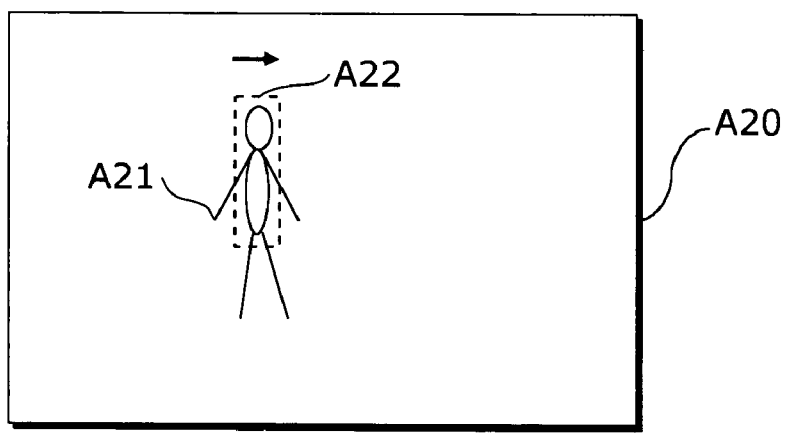
FIG. 1B shows another example of the rectangle area detected by the conventional human searching/tracking apparatus.
Figure 1C:
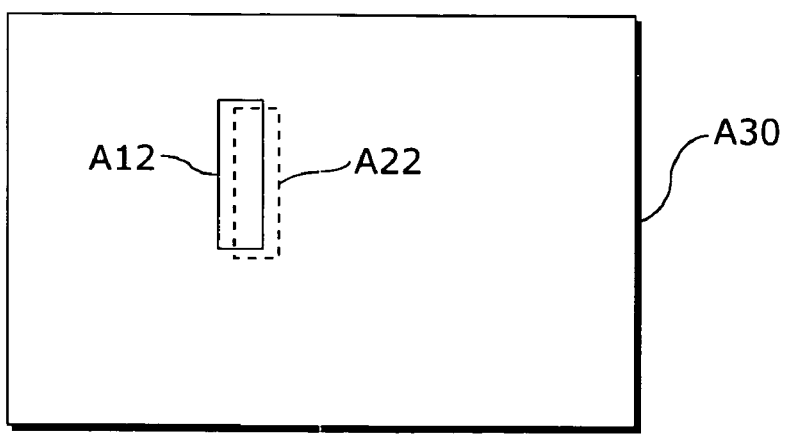
FIG. 1C shows an example of a movement of the rectangle area detected by the conventional human searching/tracking apparatus.

The human identification apparatus according to the present invention judges whether or not persons represented by human images respectively included in different image sequences are the same person, and includes: an image sequence receiving unit which receives inputs of a first image sequence and a second image sequence obtained at a time different from a time when the first image sequence is obtained or by an image sensor different from an image sensor used for obtaining the first image sequence; a walking sequence extracting unit which extracts first and second walking sequences, each being an image sequence indicating a walking state of a person, from the respective inputted first and second image sequences; a gait information extracting unit which extracts first and second gait information, each being information which specifies a periodic walking movement of a person based on the respective extracted first and second walking sequences; a gait information verifying unit which verifies between the extracted first information and the extracted second gait information; and a judging unit operable to verify whether or not the persons represented by the human images respectively included in the first and second image sequences are the same person, based on a result of the verification performed by the gait information verifying unit. The gait information here may be, for instance, information indicating temporal or spatial phase information regarding a periodic walking movement of a person or temporal or spatial position information indicating a periodic walking movement of a person.

Thus, the judgment for the identification of persons is made based on human gait, therefore, it is possible, compared to the conventional technique of judging that human images located in similar positions between frames represent a same person or identifying persons based on colors and image patterns, to judge for the identification of persons even in the case where a person to be searched for or tracked is hidden behind another person or an object, or a normal detection cannot be temporarily carried out in a frame due to change in lighting conditions. That is to say that the present invention is conceived based on the facts that gait characteristics such as a walking cycle and a length of stride differ from person to person, and that an individual walks with the same gait characteristics. It is therefore possible to identify persons irrespective of one's temporal or spatial position, and also to judge whether human images respectively included in temporally-distant frames or in frames shot by different cameras represent the same person.

The gait information verifying unit may verify the first and second gait information by comparing, based on first and second spatiotemporal phase information respectively included in the first and second gait information, times or positions at/in which the human images respectively included in the first and second image sequences take a predetermined walking posture. More precisely, the gait information verifying unit has: a phase information estimating unit which estimates, for the human image included in the first image sequence, spatiotemporal phase information at a time or in a position different from a time or a position of the first image sequence; and a gait information verifying unit which verifies between the first gait information and the second gait information by comparing, based on the spatiotemporal phase information estimated by the phase information estimating unit and the second spatiotemporal phase information, times or positions in which the persons represented by the human images respectively included in the first and second image sequences take the predetermined walking posture.

Thus, accuracy of the judgment can be improved compared to the case of judging whether or not the human images represent the same person based only on spatiotemporal period information. For example, in the case where two persons having the same length of stride and walking speed are shot in the same image sequence, it is difficult to distinct one from the other since they have the same spatiotemporal period information. However, although they have the same spatiotemporal period information, if timings of criss-crossing the legs or positions differ between them, their spatiotemporal phase information differ as well. It is therefore possible to make a precise judgment using spatiotemporal phase information.

The gait information verifying unit may verify between the first and second gait information by comparing, based on the first and second spatiotemporal phase information respectively included in the first and second gait information, walking postures of the human images included in the respective first and second image sequences of a same time or position. More concretely, the gait information verifying unit has: a phase information estimating unit which estimates, for the human image included in the first image sequence, spatiotemporal phase information indicating a time or a position different from a time or a position of the first image sequence; and a gait information verifying unit which verifies between the first gait information and the second gait information by comparing, based on the spatiotemporal phase information estimated by the phase information estimating unit and the second spatiotemporal phase information, walking postures of the human images respectively included in the first and second image sequences of a same time or position.

A walking sequence may be, for example, an image presenting a cross-section in the case where each image sequence is cut based on time. To be specific, it is an image obtainable by arranging fragmented image areas generated by cutting an image presenting the legs of the human images respectively included in the image sequences. In this way, it is possible to extract, temporally and spatially, gait characteristics of a person.

The image sequence receiving unit may receive inputs of the first and second image sequences obtained by different image sensors which have shot the same place. Thus, it is possible to judge whether or not the persons, who are represented by the human images which are respectively included in the different image sequences that are obtained by shooting, from different angles, the same location having dead places, are the same person.

The human identification apparatus may further include: a correction information holding unit which previously holds correction information indicating a correlation between a position within an image of the respective first and second image sequences, and a position in a shooting location; a correcting unit which makes, based on the correction information held in the correction information holding unit, a spatiotemporal correction for the extraction of the first and second gait information performed by the gait information extracting unit. Thus, even in the case where the frames are obtained by different image sensors, a mismatch, which is detected between the images based on a difference in position in which the respective image sensors are set as well as a difference in shooting direction, is corrected, so that it is possible to judge for the identification of the persons represented by the human images respectively included in the frames obtained by different image sensors.

The correction information may be, for example, information which specifies grid lines that two-dimensionally section, at regular intervals, a surface on which a person walks in a shooting place.

In order to achieve the above object, the human searching/tracking apparatus according to the present invention searches for or tracks a specific person in an image sequence obtained by shooting a person, and includes: the human identification apparatus; and a walking sequence storing unit operable to store, in an associated manner, the first and second walking sequences respectively corresponding to first and second gait information, in the case where the gait information verifying unit of the human identification apparatus verifies that the first gait information matches the second gait information. Thus, each of the matched walking sequences is previously analyzed and held so that a person can be searched for or tracked while the image sequence is displayed, which speeds up the processing.

In order to achieve the above object, the human searching/tracking apparatus according to the present invention searches for or tracks a specific person in an image sequence obtained by shooting a person, and includes: the human identification apparatus; and a display unit operable to display the first and second image sequences received by the image sequence receiving unit of the human identification apparatus, wherein said display unit is operable to display in a highlighted manner, the human images judged by the judging unit of the human identification apparatus to represent the same person, so that the identified human images are distinguished from the other human images, the identified human images being identified from among the human images included in the first and second image sequences. Thus, even when different images are simultaneously displayed, the identified persons can be promptly perceived by displaying the persons in a highlighted manner. This facilitates a search or tracking of a person.

Another aspect of the human searching/tracking apparatus according to the present invention searches for or tracks a specific person in an image sequence obtained by shooting a person, and includes: a human image judging unit which has: an image sequence receiving unit operable to receive inputs of a first image sequence, and a second image sequence which is obtained in one of the following manners: at a time different from a time when the first image sequence is obtained; and by an image sensor different from an image sensor used for obtaining the first image sequence; a walking sequence extracting unit operable to extract, from the respective received first and second image sequences, first and second walking sequences, each sequence being an image sequence indicating a walking state of a person; a gait information extracting unit operable to extract, from the respective extracted first and second walking sequences, first spatiotemporal period information and first spatiotemporal phase information as first gait information, and second spatiotemporal period information and second spatiotemporal phase information as second gait information, the spatiotemporal period information indicating a temporal or spatial walking period of a person, the spatiotemporal phase information indicating a temporal or spatial phase information in periodic walking movement of a person, and the gait information indicating specifying a periodic motion in human gait; a gait information verifying unit operable to verify between the extracted first gait information and the extracted second gait information; and a judging unit operable to judge whether or not the respective persons represented by the human images included in the first and second image sequences are the same person, based on a result of the verification performed by the gait information verifying unit; and a walking sequence storing unit operable to store, in an associated manner, the first and second walking sequences respectively corresponding to the first and second gait information, in the case where the gait information verifying unit of the human identification apparatus verifies that the first gait information matches the second gait information.

Yet another aspect of the human searching/tracking apparatus of the present invention searches for or tracks a specific person in an image sequence obtained by shooting a person, and includes: a human identification apparatus which has: an image sequence receiving unit operable to receive inputs of a first image sequence, and a second image sequence which is obtained in one of the following manners: at a time different from a time when the first image sequence is obtained; and by an image sensor used for obtaining the first image sequence; a walking sequence extracting unit operable to extract, from the respective received first and second image sequences, first and second walking sequences, each sequence being an image sequence indicating a walking state of a person;

a gait information extracting unit operable to extract, from the respective extracted first and second walking sequences, first spatiotemporal period information and first spatiotemporal phase information as first gait information, and second spatiotemporal period information and second spatiotemporal phase information as second gait information, the spatiotemporal period information indicating a temporal or spatial walking period of a person, the spatiotemporal phase information indicating a temporal or spatial phase information in periodic walking movement of a person, and the gait information specifying a periodic motion in human gait; a gait information verifying unit operable to verify between the extracted first gait information and the extracted second gait information; and a judging unit operable to judge whether or not the persons represented by the human images respectively included in the first and second image sequences are the same person; and a display unit operable to display the first and second image sequences received by the image sequence receiving unit of the human identification apparatus, wherein the display unit is operable to display, in a highlighted manner, the human images judged by the judging unit of the human identification apparatus to represent the same person, so that the identified human images are distinguished from the other human images, the identified human images being identified from among the human images included in the first and second image sequences.

Another aspect of the human identification apparatus of the present invention judges whether or not persons represented by human images respectively included in different image sequences are the same person, and includes: a walking sequence detecting unit operable to detect first and second walking sequences, each sequence being an image sequence indicating a walking state of first or second person respectively included in the image sequences; a walking posture transition estimating unit operable to estimate, based on the walking sequence of the first person, information indicating a transition of a walking posture in a periodic walking movement of the first person at a time or in a position different from a time or a position of the walking sequence of the first person; and a judging unit operable to verify whether or not the estimated information indicating the transition of the walking posture of the first person matches information indicating a transition of a walking posture of the second person, and to judge that the first person and the second person are the same person in the case of verifying that the information match with each other.

Thus, the judgment for the identification of persons is made based on human gait, so that it is possible to judge for the identification of persons even in the case where a normal detection cannot be temporarily carried out since a person to be searched for or tracked is hidden behind another person or an object, or due to change in lighting conditions. That is to say, the present invention is conceived based on the facts that gait characteristics such as a walking cycle and a length of stride differ from person to person, and that an individual keeps the same gait characteristics. It is therefore possible to identify persons irrespective of one's temporal or spatial position, and also to judge whether the persons represented by the human images respectively included in temporally-distant frames or in frames shot by different cameras are the same person.

Note that the present invention can be realized not only as such human identification apparatus and the human searching/tracking apparatus as described above, but also as a human image judging method, a human image searching/tracking method, or a program causing a computer to execute such methods, and even as a computer-readable storage medium on which the program is stored.

The following describes the embodiments of the preset invention with reference to the diagrams.

First Embodiment

Figure 2:
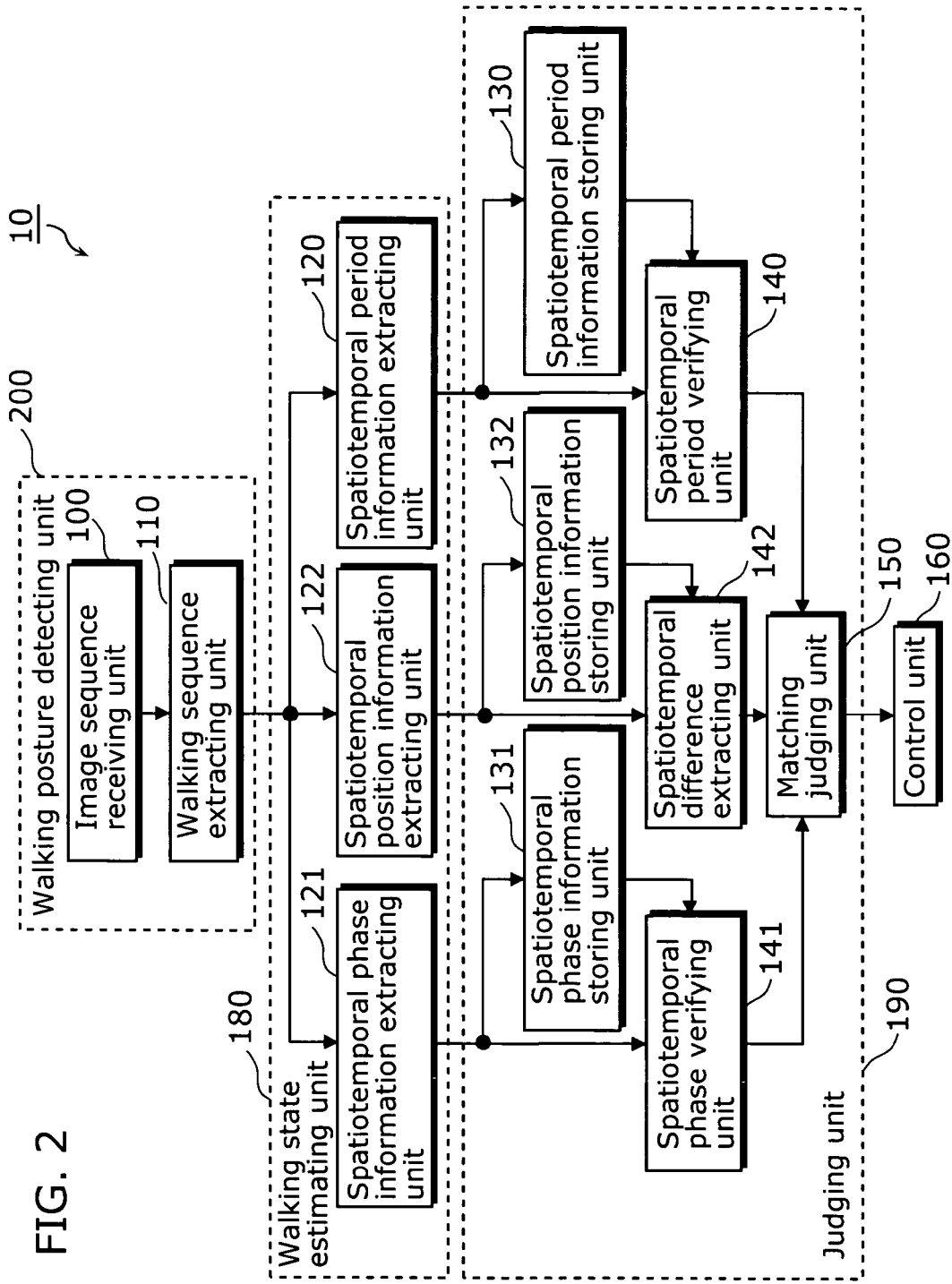
FIG. 2 is a functional block diagram showing a structure of a human identification apparatus according to a first embodiment of the present invention.

FIG. 2 is a functional block diagram showing a structure of the human identification apparatus 10 according to the preset embodiment. The human identification apparatus 10 is an apparatus which judges whether or not persons represented by the human images respectively included in different sequences are the same person based on a continuity of walking sequence of a person. Such human identification apparatus 10 includes a walking posture detecting unit 200, a walking state estimating unit 180 and a judging unit 190.

The walking posture detecting unit 200 is a processing unit which detects, in a moving picture, a walking sequence including a predetermined walking posture of a first person.

The walking state estimating unit 180 is a processing unit which estimates, based on a walking sequence of the first person, a walking state (a transition state of posture in periodic walking movement) of the first person at a time or in a position different from a time or a position of the walking sequence of the first person.

The judging unit 190 is a processing unit which verifies whether or not a walking state of the first person matches a walking state of a second person, and judges that the first person and the second person are the same person in the case where the walking states match with each other.

The walking posture detecting unit 200 includes an image sequence receiving unit 100 and a walking sequence extracting unit 110.

The walking state estimating unit 180 includes a spatiotemporal period information extracting unit 120, a spatiotemporal phase information extracting unit 121 and a spatiotemporal position information extracting unit 122.

The judging unit 190 includes a spatiotemporal period information storing unit 130, a spatiotemporal phase information storing unit 131, a spatiotemporal position information storing unit 132, a spatiotemporal period verifying unit 140, a spatiotemporal phase verifying unit 141, a spatiotemporal difference extracting unit 142, a matching judging unit 150 and a control unit 160.

Here, the walking posture detecting unit 200 is an example of the walking sequence detecting unit which detects a walking sequence being an image sequence indicating a walking state of a human image included in the image sequence. The walking state estimating unit 180 is an example of the walking posture transition estimating unit which estimates, based on the detected walking sequence, information indicating a transition of a walking posture in a periodic walking movement at a time or in a position different from a time or a position of the detected walking sequence. The judging unit 190 is an example of the judging unit which judges whether or not the information indicating respective transitions of two persons shot at different times or with different image sensors, and judges whether or not the two persons are identified as the same person. Note that "information indicating a transition of walking posture" is information which includes the period information and phase information which will be mentioned later.

The image sequence receiving unit 100 is an example of the image sequence receiving unit which receives inputs of first and second image sequences respectively obtained at a different time or with a different image sensor.

The walking sequence extracting unit 110 is an example of the walking sequence extracting which extracts first and second walking sequences, each being an image sequence indicating a walking state of a person based on the respective first and second image sequences.

The spatiotemporal phase information extracting unit 121, the spatiotemporal position information extracting unit 122 and the spatiotemporal period information extracting unit 120 are examples of the gait information extracting unit which extracts first and second gait information, each being information which specifies a periodic walking movement of a person, based on the respective first and second walking sequences.

The spatiotemporal phase verifying unit 141, the spatiotemporal difference extracting unit 142 and the spatiotemporal period verifying unit 140 are examples of the gait information verifying unit which verifies between the extracted first gait information and the extracted second gait information.

The matching judging unit 150 is an example of the judging unit which judges whether or not the human images respectively included in the first and second image sequences represent the same person, based on the result of the verification.

Figure 3:
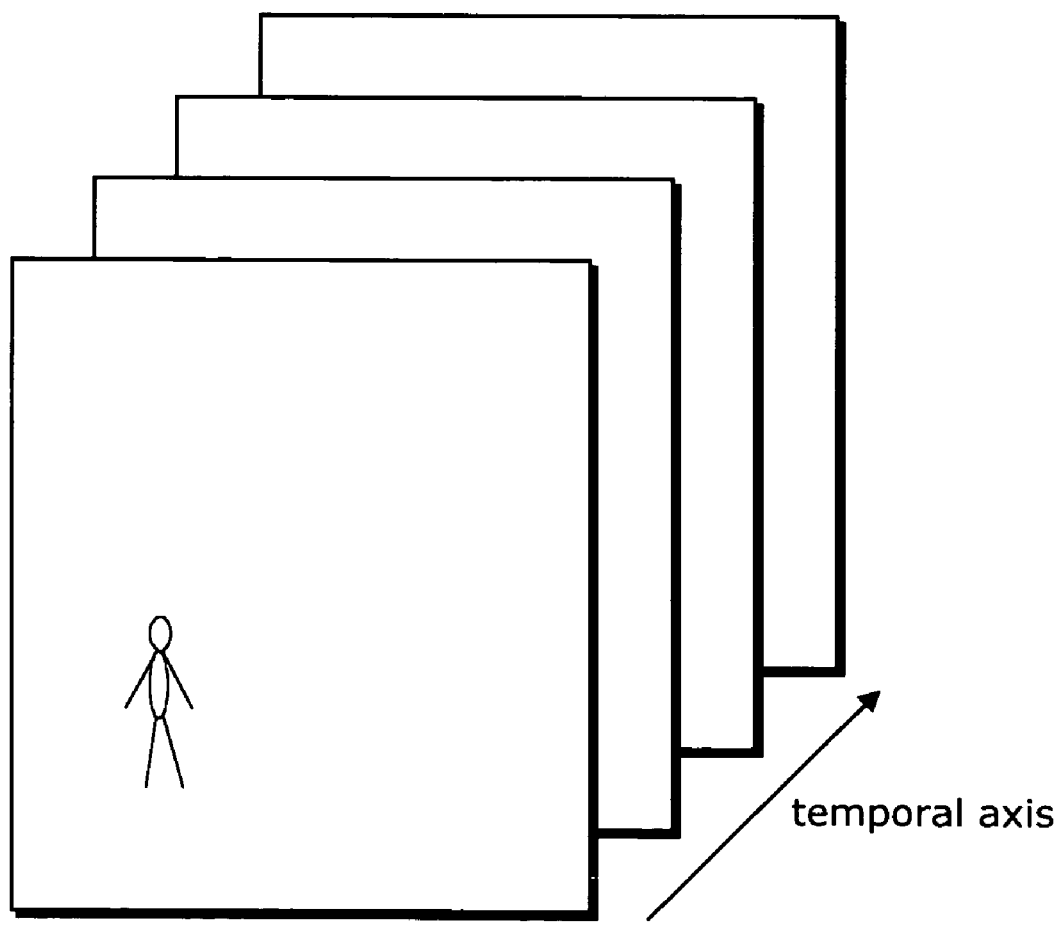
FIG. 3 shows an example of an image sequence according to the first embodiment of the present invention.

The image sequence receiving unit 100 is a signal interface, or the like, which obtains an image sequence from a camera or an image storing apparatus. The "image sequence" is an array in which shot frame images are arranged along a temporal axis, as shown in FIG. 3.

Figure 4A:
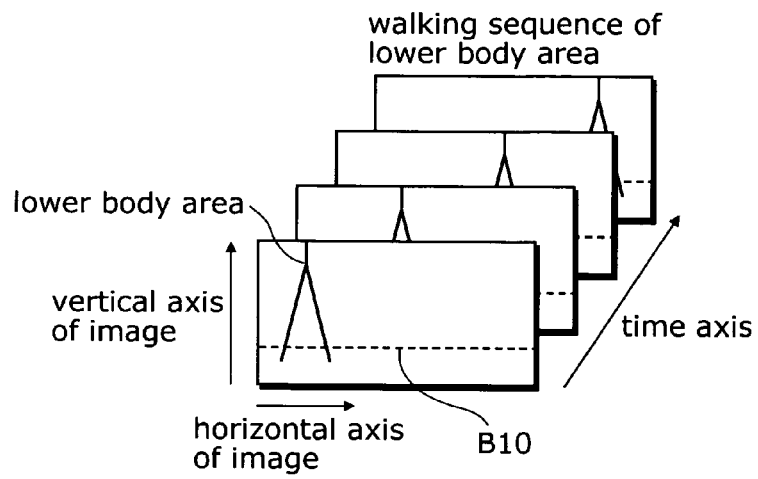
FIG. 4A shows an example of an image sequence of a lower human body image.
Figure 4B:
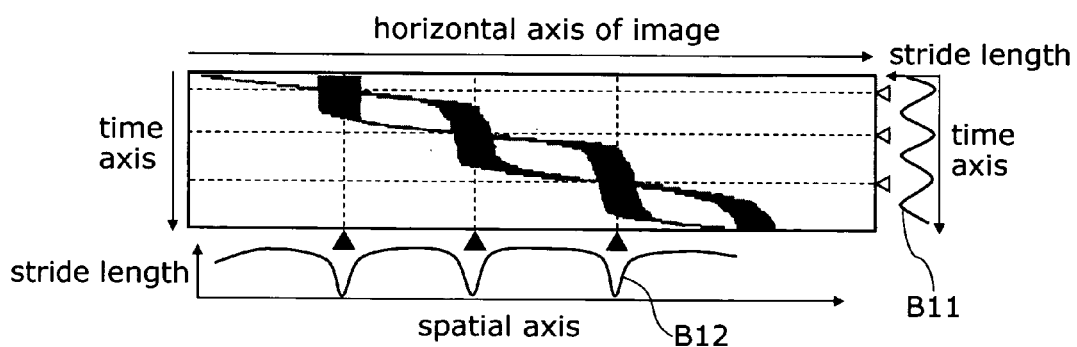
FIG. 4B shows an example of a walking sequence according to the first embodiment of the present invention.

The walking sequence extracting unit 110 is a processing unit which extracts a walking sequence from the image sequence obtained by the image sequence receiving unit 100. The "walking sequence" is a sequence of a walking state obtained from a walking movement area in each frame image. FIG. 4B shows an example of such walking sequence. FIG. 4A shows a sequence of lower body areas, each being extracted from each frame, and the respective extracted areas are sequentially arranged in time order. FIG. 4B is a graph obtained by arranging the extracted areas along a temporal axis at a dashed line B10 as shown in FIG. 4A. A black band in FIG. 4B shows a trace of moving toes (obtained by arranging respective images of each leg along the temporal axis). A method of calculating each walking sequence will be described later.

Figure 4C:
FIG. 4C shows an example of a form of the smallest pattern indicating a walking sequence.

The spatiotemporal period information extracting unit 120 is a processing unit which extracts period information being a spatiotemporal change in walking, based on the walking sequence extracted by the walking sequence extracting unit 110. The "period information" is a result obtained by frequency number analysis made with respect to strides per predetermined period of time or predetermined distance and spatiotemporal positional change of a specific body part such as feet and hands, or a form of the smallest pattern to be repeated spatiotemporally and periodically. FIG. 4B shows an example of such spatiotemporal period information. In FIG. 4B, a black or white triangular mark denotes a spatiotemporal point at which the toes cross in temporal axis and a horizontal axis (as opposed to spatial axis) of the image. The spatiotemporal period information may be the number of strides per predetermined period of time or predetermined distance obtained based on spatial intervals between the neighboring black triangular marks as well as temporal intervals between the neighboring white triangular marks. In addition, a form per se of walking pattern surrounded by a dashed line linking the neighboring black triangular marks and a dashed line linking the neighboring white triangular marks (FIG. 4C), or a frequency characteristic (spectral intensity of a specific frequency band) obtained by frequency analysis made with respect to a temporal change in stride length as shown in a curved line B11 in FIG. 4B, and a spatial change in stride length as shown in a curved line B12 may be also used as the spatiotemporal period information.

The spatiotemporal period information storing unit 130 is a memory for storing the spatiotemporal period information extracted by the spatiotemporal period information extracting unit 120, together with the time and the position in the image which are detected. The spatiotemporal period verifying unit 140 is a processing unit which verifies between the spatiotemporal period information extracted by the spatiotemporal period information extracting unit 120 and the spatiotemporal period information held in the spatiotemporal period information storing unit 130.

Figure 5:
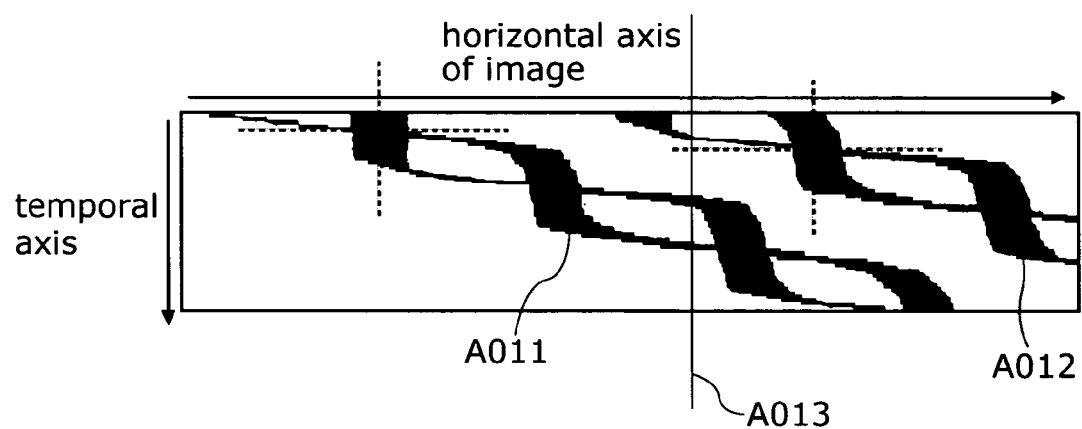
FIG. 5 is a diagram showing spatiotemporal phase information and spatiotemporal position information, according to the first embodiment of the present invention.
Figure 6A:
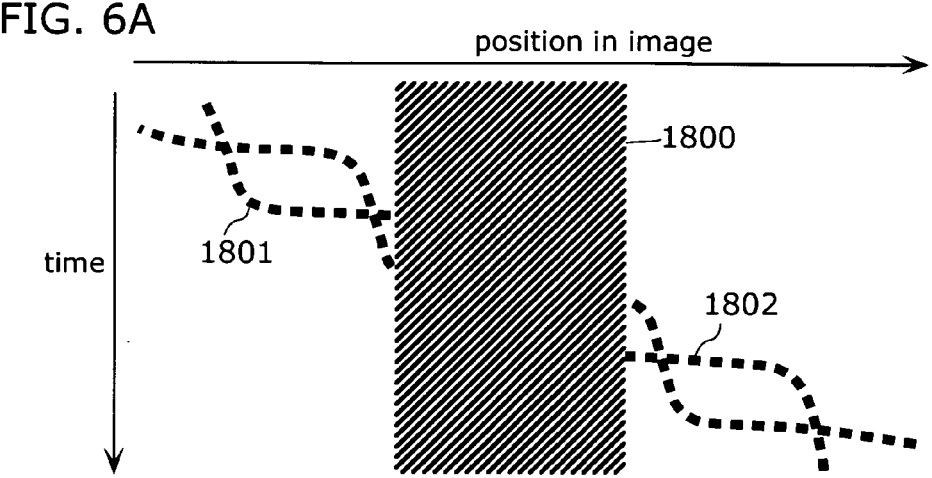
FIG. 6A shows an example of a walking trace according to the first embodiment of the present invention.

The spatiotemporal phase information extracting unit 121 is a processing unit which extracts phase information indicating a spatiotemporal change in walking, based on the walking sequence extracted by the walking sequence extracting unit 110. The "phase information" means a transition state (e.g. a position or time in which a predetermined walking posture is taken, or a walking posture in a specific position or at a specific time) during the periodic exercise of walking. The spatiotemporal phase information, for example, is information indicating a spatiotemporal position in which a foot touched the ground (a predetermined walking posture) for the walking sequences of the same spatiotemporal period. The spatiotemporal phase information indicates also a difference in walking posture between two walking sequences compared at a same time or in a same position. An example of such spatiotemporal phase information will be described using FIGS. 5, 6A through 6C and 7A through 7C. FIG. 5 shows a walking trace of a foot position, as shown in FIG. 4B, but shows different walking traces A010 and A011 of different two persons who have the same spatiotemporal period but a different spatiotemporal phase. Comparing the walking traces A010 and A011, a stride length and a walking period are the same, but a position or a time in/at which a foot touches the ground or a position or a time in/at which the legs are crossed are different. FIG. 6A shows two walking traces (a walking trace 1802 (in a dashed line) of a first person and a walking trace 1801 (in a full line) of a second person) which are detected as in discontinuity because of an obstacle 1800 (a hatched area). A case of detecting phase information based on the respective walking traces is considered here. Phase information, as is already described above, is a position or a time in/at which a predetermined walking posture is taken or a walking posture in a predetermined position or at a predetermined time. As for the walking traces of different times or positions, as in the case of the walking track 1801 of the second person and the walking track 1802 of the first person, phase information is derived based on the same criterion. In such case, the spatiotemporal phase information extracting unit 121 estimates a walking posture at a time or in a position except for the time or the position at/in which a frame is shot, based on a position, a time or a periodicity of the predetermined posture (e.g. crossing of the legs) in the gait information 1802 of the first person (a dashed line 1803 in FIG. 6B). Similarly, in FIG. 6C, the spatiotemporal phase information extracting unit 121 estimates a walking posture (a dashed line 1805) at a different time or in a different position based on a walking trace 1804 (in a dashed line) in the right of the obstacle 1800.

The spatiotemporal phase information extracting unit 121 then obtains a time or a position at/in which the predetermined walking posture is taken. Here, crossing of the legs (a state in which a stride length becomes the smallest) is assumed to be the predetermined posture. FIG. 7A shows a temporal or positional change in stride length. The stride length can be derived, based on images, as a width between the tracings of the respective legs in a walking trace. As shown in FIG. 7B, the spatiotemporal phase information extracting unit 121 estimates a state (posture) 1903a (in a dashed line) of the stride length at a time or in a position at/in which a person is not shot due to an obstacle 1900a (a hatched area), based on stride length information 1902a (a dashed line) of the first person. The spatiotemporal phase information extracting unit 121 obtains, as phase information, an area which is shot at an earlier time and in the left within the image. The time and the position are a time and a position at/in which the human image takes the predetermined posture. In FIG. 7B, a time or position 1905 is obtained as phase information for an estimated walking state 1903a of the first person, while a time or position 1906 is obtained for the walking state 1901a of the second person. Similarly, in FIG. 7C, phase information 1910 is obtained for a walking state 1909a (a dashed line) estimated for the walking state 1908a (a dashed line), while phase information 1911 is obtained for a walking state 1907a (a full line).

The spatiotemporal phase information extracting unit 121 obtains a walking state or an estimated walking state at a predetermined time or in a predetermined position also in the case of using, as phase information, a posture at a predetermined time or in a predetermined position. In the case of FIG. 7B, the spatiotemporal phase information extracting unit 121 obtains a stride length (walking posture) at a predetermined time or in a predetermined position 1904. The phase information for the first person shall be a value indicating an estimated walking state 1903a (a dashed line) at the predetermined time or position 1904, whereas the phase information for the second person shall be a value indicating the walking state 1901a (a full line) at the predetermined time or position 1904. Similarly, in FIG. 7C, the value indicating an estimated walking state 1909a at the predetermined time or position 1904, which is estimated based on the walking state 1908a, and the value indicating the walking state 1907a at the predetermined time or position 1904 are the phase information of the first person and the second person, respectively.

In the above description, an estimated posture is used only for the first person, however, an estimated posture may be obtained for the second person so that phase information is obtained for both the first and second persons based on the estimated postures. A location of an obstacle in FIGS. 6A through 6C and 7A through 7C and an area except for the area indicated in the diagram may be determined as fixed parts, so as to obtain phase information after deriving an estimated state in the fixed parts.

It should be noted that other state, such as a position at which a stride length becomes the largest and a state in which a change in stride length becomes the largest, may be used as the predetermined posture.

The spatiotemporal phase information storing unit 131 is a memory for storing the spatiotemporal phase information extracted by the spatiotemporal phase information extracting unit 121 together with a time as well as a position in an image which are detected. The spatiotemporal phase verifying unit 141 is a processing unit which verifies between the spatiotemporal phase information extracted by the spatiotemporal phase information extracting unit 121 and the spatiotemporal phase information held in the spatiotemporal phase information storing unit 131.

The spatiotemporal position information extracting unit 122 refers to the walking sequence extracted by the walking sequence extracting unit 110, extracts a spatiotemporal position at which the walking sequence is extracted, and generates spatiotemporal position information. The "spatiotemporal position information" means a time or a place where the walking sequence is detected. An example of such spatiotemporal position information is described in FIG. 5. In FIG. 5, a cross-shape in dashed line presents a spatiotemporal position at which the legs are crossed for the first time with regard to respective two walking traces. Thus, the spatiotemporal position information is information indicating an absolute position of spatiotemporal walking.

The spatiotemporal position information storing unit 132 is a memory for storing the spatiotemporal position information generated by the spatiotemporal position information extracting unit 122. The spatiotemporal difference extracting unit 142 is a processing unit which obtains a difference between the spatiotemporal position information generated by the spatiotemporal position information extracting unit 122 and the spatiotemporal position information held in the spatiotemporal position information storing unit 132.

The matching judging unit 150 is a processing unit which judges whether or not different walking sequences match with each other, based on the results obtained by the spatiotemporal period verifying unit 140, the spatiotemporal phase verifying unit 141 and the spatiotemporal difference extracting unit 142. That is to say, the matching judging unit 150 judges whether or not the walking sequences are of the same person. An example of the method of judging on matching with regard to the spatiotemporal period information is as follows. In the case where the number of strides x within a predetermined period and the number of strides y within a predetermined distance are used as the spatiotemporal period information, the matching judging unit 150 judges that the two walking sequences match with each other, when the following equations are satisfied: $|Z1-Z2|<\theta$, where $|Z1-Z2|$ denotes a difference between a vector $Z1=(x1,y1)$ obtained for a pair of x and y based on one of the walking sequences to be judged for verification and a vector $Z2=(x2,y2)$ obtained based on the other walking sequence, and $\theta$ denotes a predetermined threshold; and $|x1-x2|<\theta x$, $|y1-y2|<\theta y$ ($\theta x$ and $\theta y$ are predetermined values). In other words, the matching judging unit 150 judges that the walking sequences are of the same person.

The matching judging unit 150 judges the respective spatiotemporal phase information and spatiotemporal position information in the same way as in the case of the spatiotemporal period information, and in the case where the information match with each other for all the items or the specified number of items, the matching judging unit 150 judges that the two walking sequences match with each other. It should be noted that the judging unit is not limited to the one described above, and a method used for pattern recognition may be generally applied.

Figure 6B:
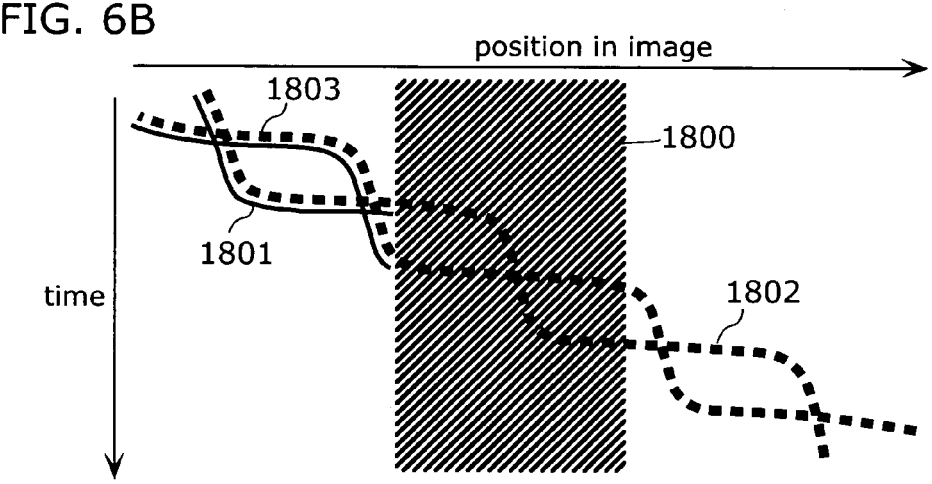
FIG. 6B shows an example of a state of walking estimated according to the first embodiment of the present invention.
Figure 6C:
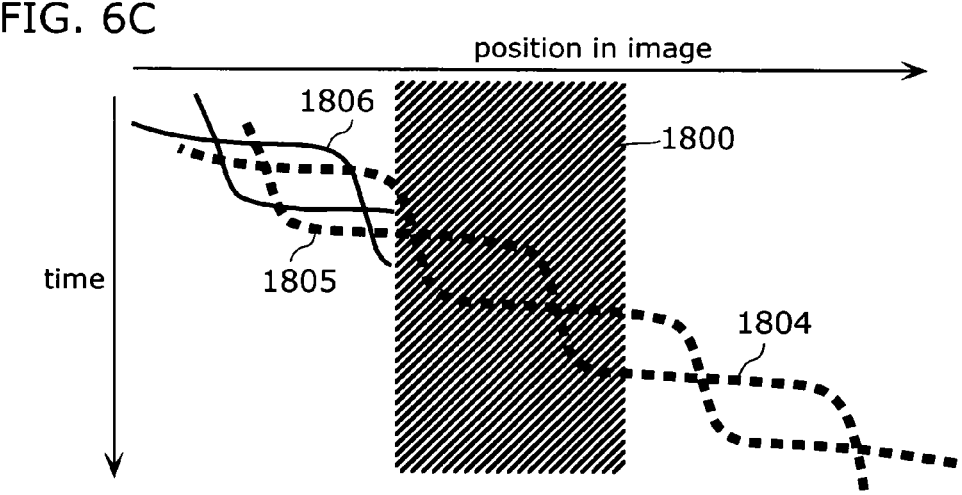
FIG. 6C shows an example of walking states of different phases, according to the first embodiment of the present invention.

For example, in the case of using spatiotemporal phase information, the temporal phase information tp1 and the spatial phase information (phase information of position) sp1 which are obtained from the walking sequence of the first person in the moving picture are compared with the temporal phase information tp2 and the spatial phase information (phase information of position) sp2 which are obtained based on the walking sequence of the second person at a time or in a position different from the time and the position at/in which the phase information tp1 and sp1 are obtained. In such case, the matching judging unit 150 judges that the first person and the second person are the same person in the case where one or both of the following equations is/are satisfied: $|tp1-tp2|<\theta t$ ($\theta t$ is a predetermined threshold); and $|sp1-sp2|<\theta s$ ($\theta s$ is a predetermined threshold). In the case of FIG. 6B, for example, by appropriately setting $\theta t$ and $\theta s$, the matching judging unit 150 verifies that the spatiotemporal phase information of the walking state 1801 matches the spatiotemporal phase information of the walking state 1803, and judges that the first person and the second person are the same person. In the case of FIG. 6C, the matching judging unit 150 verifies that the spatiotemporal phase information of the walking state 1801 does not match the spatiotemporal phase information of the walking state 1803, and judges that the first person and the second person are not the same person. In FIG. 7B, the matching judging unit 150 verifies that the spatiotemporal phase information of the walking state 1901a matches the spatiotemporal phase information of the walking state 1909a, and judges that the first person and the second person are the same person. In FIG. 7C, the matching judging unit 150 verifies that the spatiotemporal phase information of the walking state 1907a does not match the spatiotemporal phase information of the walking state 1909a, and judges that the first person and the second person are different persons.

Figure 8A:
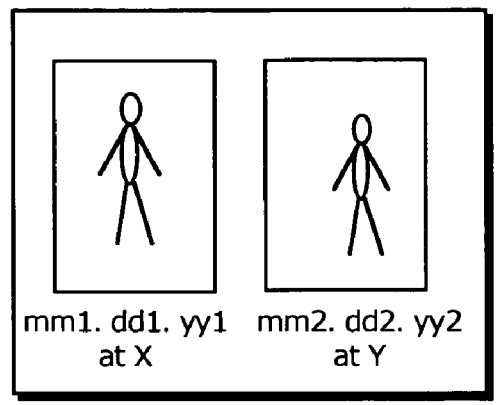
FIG. 8A shows an example of a display of the walking sequence, according to the first embodiment of the present invention.
Figure 8B:
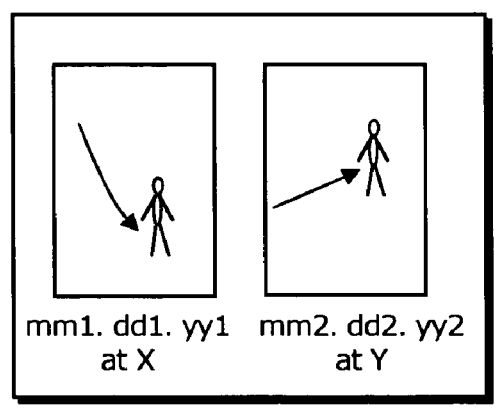
FIG. 8B shows another example of a display of the walking sequence, according to the first embodiment of the present invention.
Figure 8C:
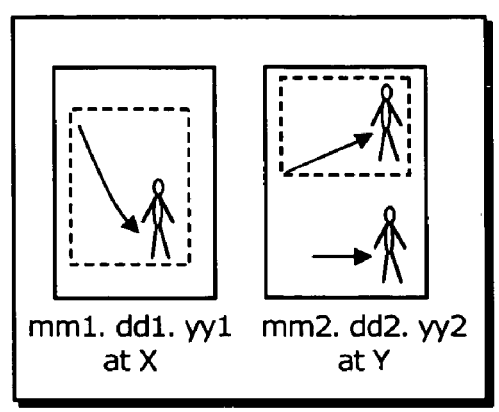
FIG. 8C shows yet another example of a display of the walking sequence, according to the first embodiment of the present invention.

The control unit 160 is a processing unit which performs display of an image sequence used for verification, as a control based on the result of the judgment made by the matching judging unit 150. FIGS. 8A through 8C show examples of such display. FIG. 8A shows an example of magnified human image areas, one in the left and the other in the right, of the two image sequences in comparison, displayed together with shooting time and place of each image sequence. FIG. 8B shows an example of the result as same as shown in FIG. 8A, displayed together with a trace of human movement (arrows in the diagram). Note that in these diagrams, shooting time and location are displayed in characters in accordance with an image sequence, however, a map may be displayed for the shooting location and a shooting position and a trace of the movement may be displayed in a superimposed manner. FIG. 8C shows an example of a display in which the area including a verified human image is highlighted with a rectangle in a dashed line, in the case where plural persons are included within an image. Note that the control unit 160 may control not only display but also storage, into an external storage apparatus (e.g. position information storing apparatus), of matching information which indicates that different walking sequences are verified to match with each other and thus correlates the walking sequences. By thus storing the information indicating matching/mismatching of different walking sequences, such information can be utilized for searching for or tracking a human walking image.

FIG. 9 shows an example of a storage format showing the result of a search or a tracking of a walking sequence by use of the process as described above. FIG. 9 presents three types of walking sequence information and information of five items for one walking sequence. The five items are sequence number, spatiotemporal period information, spatiotemporal phase information, spatiotemporal position information, and matched sequence number. A sequence number is an ID number assigned to respective walking sequences which are shot at different times with different cameras. The spatiotemporal period information presents, as (x,y), the number of strides x within a predetermined period and the number of strides y within a predetermined distance. The spatiotemporal phase information presents an amount of movement to a temporal or spatial position at which the legs are crossed for the first time since a temporal or spatial position to be used as a reference is passed with a ratio where a time and a movement amount required for a sequence of one stride are respectively determined as 1.0. For instance, in the case of sequence number 1, the legs are crossed at a time when a time required for 0.5 stride has passed from a reference time and after a distance required for 0.1 stride is walked from a reference position.

The spatiotemporal position information indicates time and place at which a walking sequence is detected for the first time. The place is represented by pixel coordinator values in vertical and horizontal directions within an image.

Matched sequence number indicates a sequence number of the walking sequence verified to match with a different walking sequence in a search or a tracking. In the case where no sequences are verified to match, the sequence number may be 0, and in the case where plural pairs of verified sequences are detected, plural sequence numbers may be described. By saving information indicating the result of the search or tracking, it is possible to omit the verification judgment by referring to the information, in the case of performing the same search or tracking.

Note that the sequence number may be associated with a reference destination (e.g. a file name and a storage address) of a shot image. As shown in FIG. 9, information about a spatial location in the spatiotemporal position information may be represented by coordinator system that is set for exclusive use, or a general coordinator such as latitude and longitude.

Figure 10:
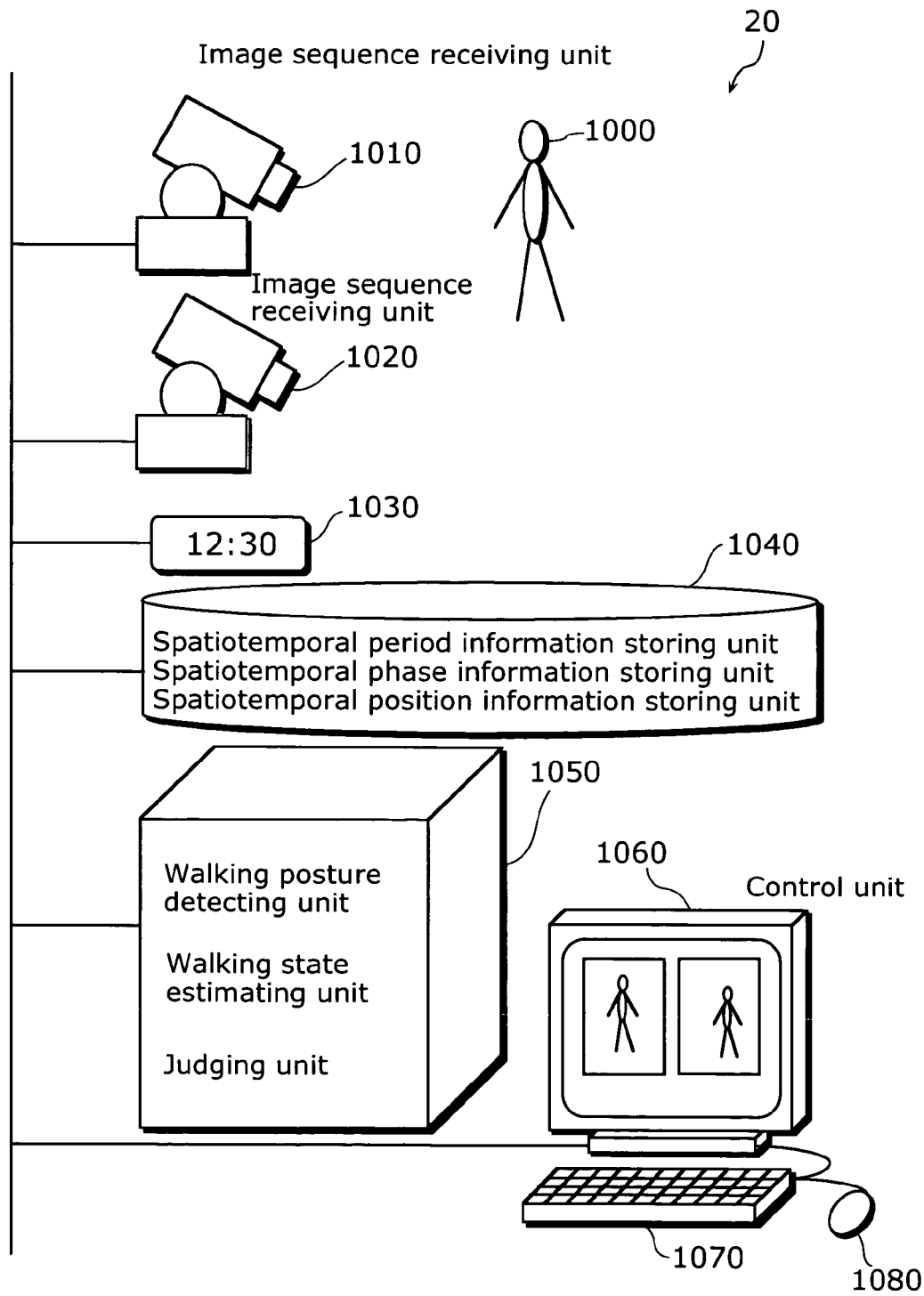
FIG. 10 is a block diagram showing a structure of the human searching/tracking apparatus according to the first embodiment of the present invention.

FIG. 10 is a block diagram showing a structure of the human searching/tracking apparatus 20 onto which the human identification apparatus 10 is applied. The human searching/tracking apparatus 20 is a concrete example of a system or an apparatus which realizes a method of searching/tracking a person in an image sequence, according to the present embodiment. Such human searching/tracking apparatus 20 includes cameras 1010 and 1020, a clock 1030, a storing apparatus 1040, a processing apparatus 1050, a display apparatus 1060, an input unit 1070 and a pointing device 1080.

Figure 11:
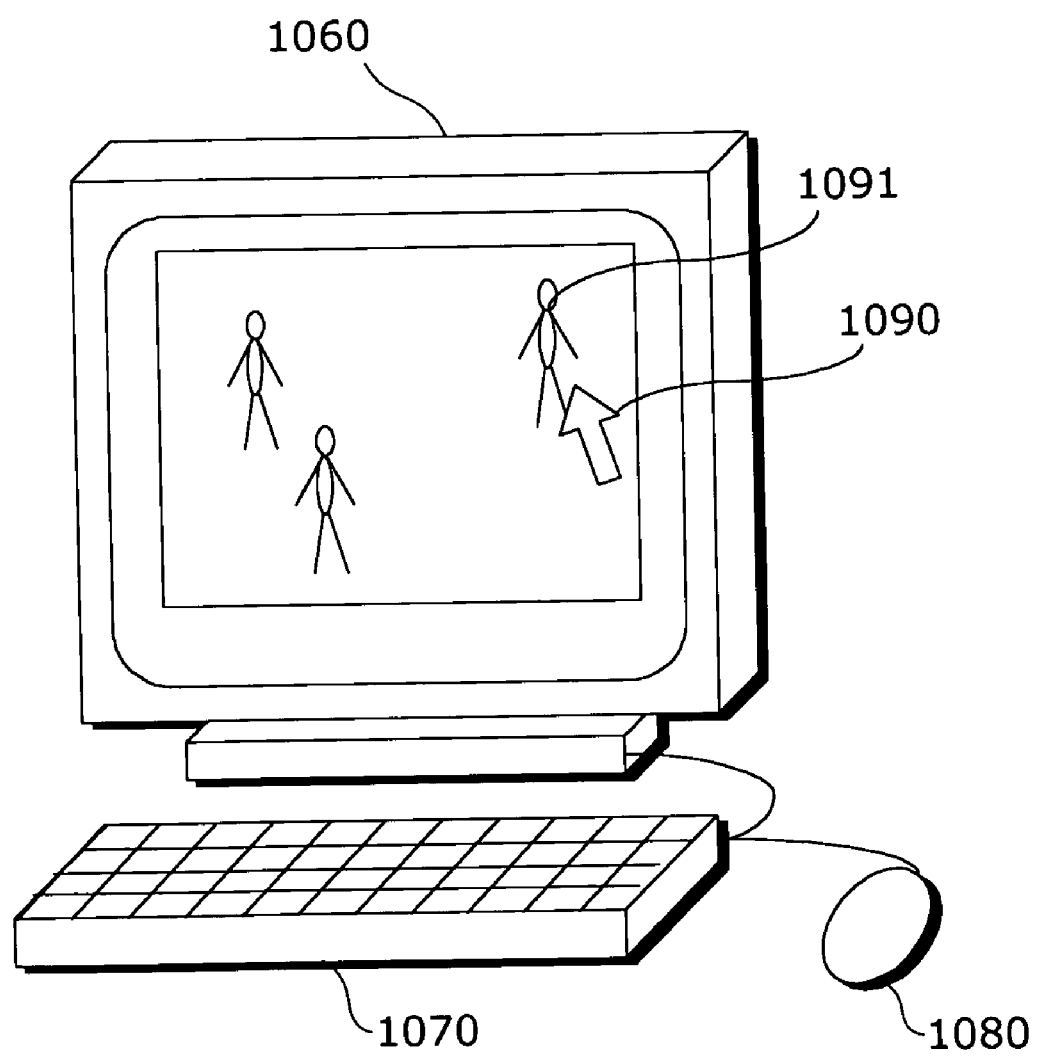
FIG. 11 shows an example of a screen for giving instructions on a search or a tracing of a person, according to the first embodiment.

The cameras 1010 and 1020 are examples of the image sequence receiving unit 100, and shoot images of a person 1000. The clock 1030 is a timer for obtaining a shooting time. The storing apparatus 1040 is a hard disk which stores the images shot with the cameras 1010 and 1020, respective shooting time obtained by the clock 1030 and the results of a search or a tracking of a person. The processing apparatus 1050 is an apparatus which searches for or tracks a person in the image sequence obtained by the cameras 1010 and 1020 or the storing apparatus 1040, and is equivalent of the human identification apparatus 10 shown in FIG. 2. The display apparatus 1060 is a display which displays a result of the processing performed by the processing apparatus 1050, while the input unit 1070 is a keyboard used for instructions on a search or tracking and the pointing device 1080 is a mouse used for the instructions on the search or tracking. FIG. 11 shows an example of pointing. In the case of searching for or tracking a person, a person 1091 to be searched/tracked is specified using a pointer 1090, for searching for or tracking a walking sequence as same as that of the person 1091.

Figure 12:
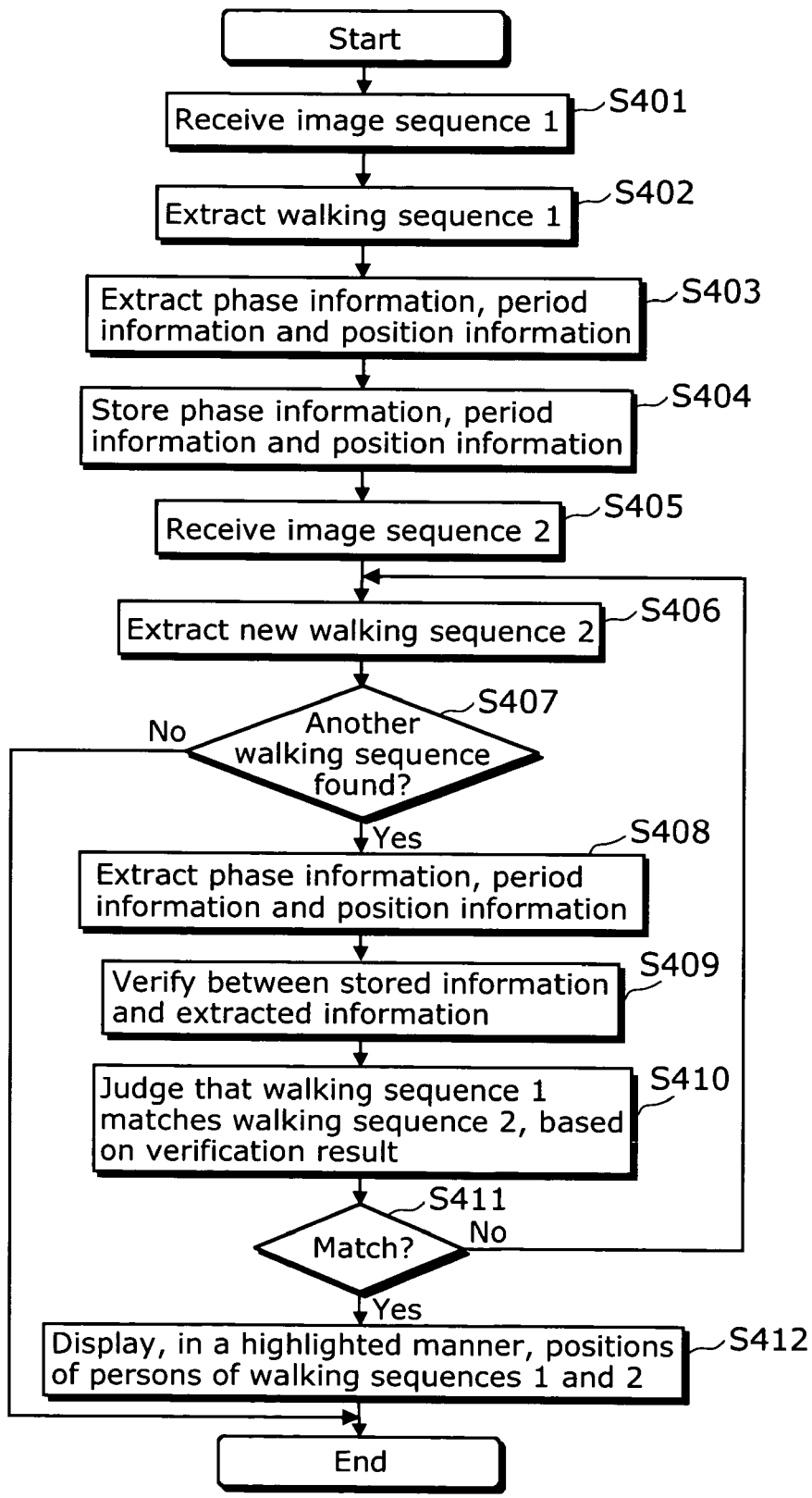
FIG. 12 is a flowchart showing an example of a verification procedure according to the first embodiment of the present invention.
Figure 13A:
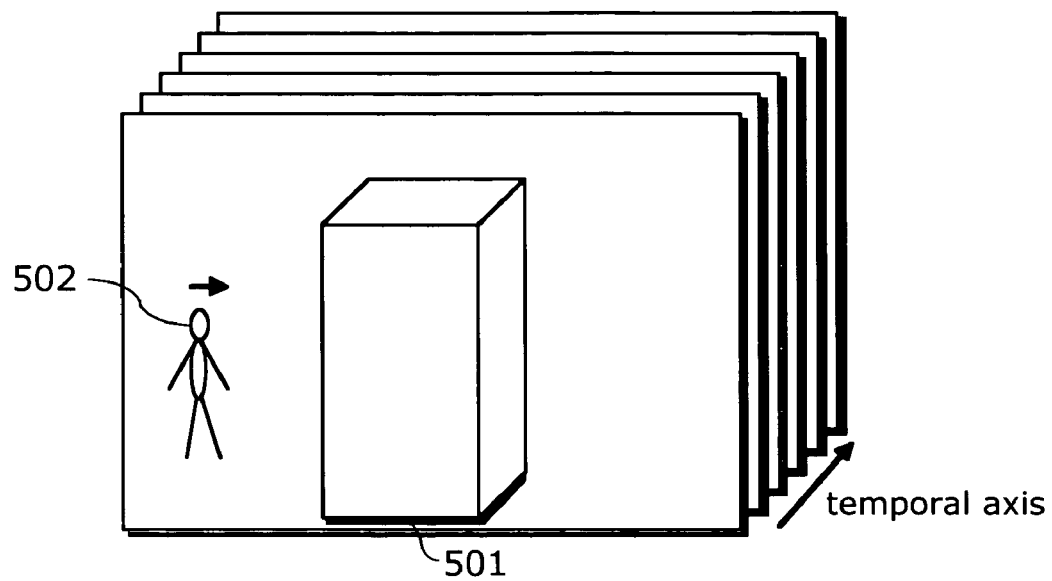
FIG. 13A shows an example of an image sequence 1 according to the first embodiment of the present invention.
Figure 13B:
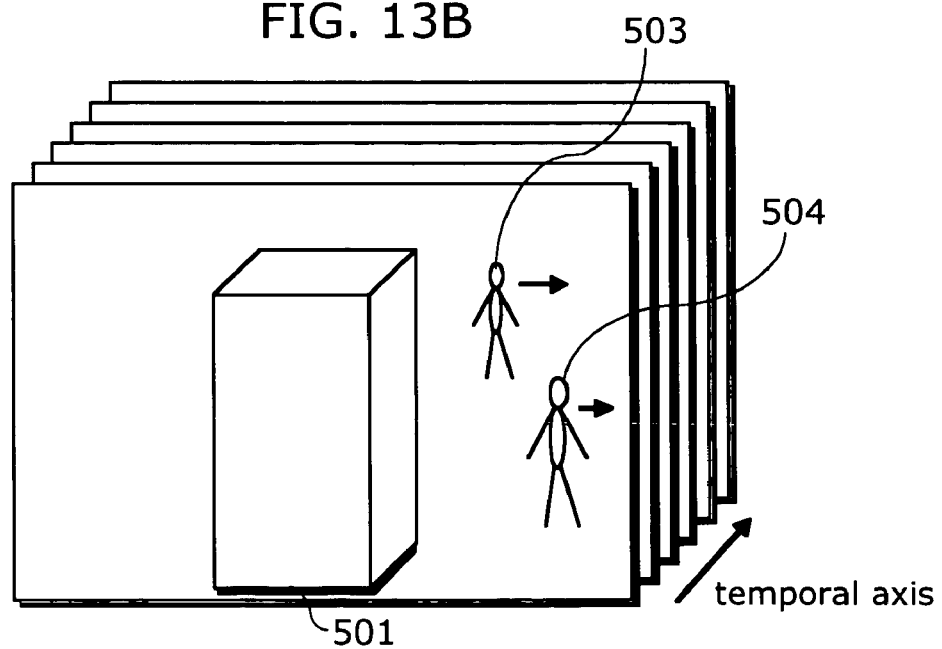
FIG. 13B shows an example of an image sequence 2 according to the first embodiment of the present invention.

Each of the components is connected via a communication path. The communication path may be wired or wireless, and may include a private line and a public line The following describes the operation of the human identification apparatus 10 described above in the present embodiment, with reference to a flowchart shown in FIG. 12. Note that, in this embodiment, the human identification apparatus 10 searches for or tracks a human image included in an image sequence 2 obtained at a different time but with the same camera as used for the image sequence 1. FIGS. 13A and 13B respectively show examples of image sequences 1 and 2. FIG. 13A shows an image sequence 1 in which a person 502 walks toward right on the left side of an obstacle 501. FIG. 13B shows an image sequence 2 obtained by shooting the same place with the same camera as the image sequence 1 after ten seconds have passed since the image sequence 1 is shot. The image sequence 2 shows the obstacle 501 and persons 503 and 504 walking toward right.

Firstly, the image sequence receiving unit 100 receives an image sequence 1 (Step S401). Then, a walking sequence (walking sequence 1) is extracted from the image sequence 1 (Step S402). In the description, a sequence of lower body area as shown in FIG. 4A is used as a walking sequence.

Figure 14:
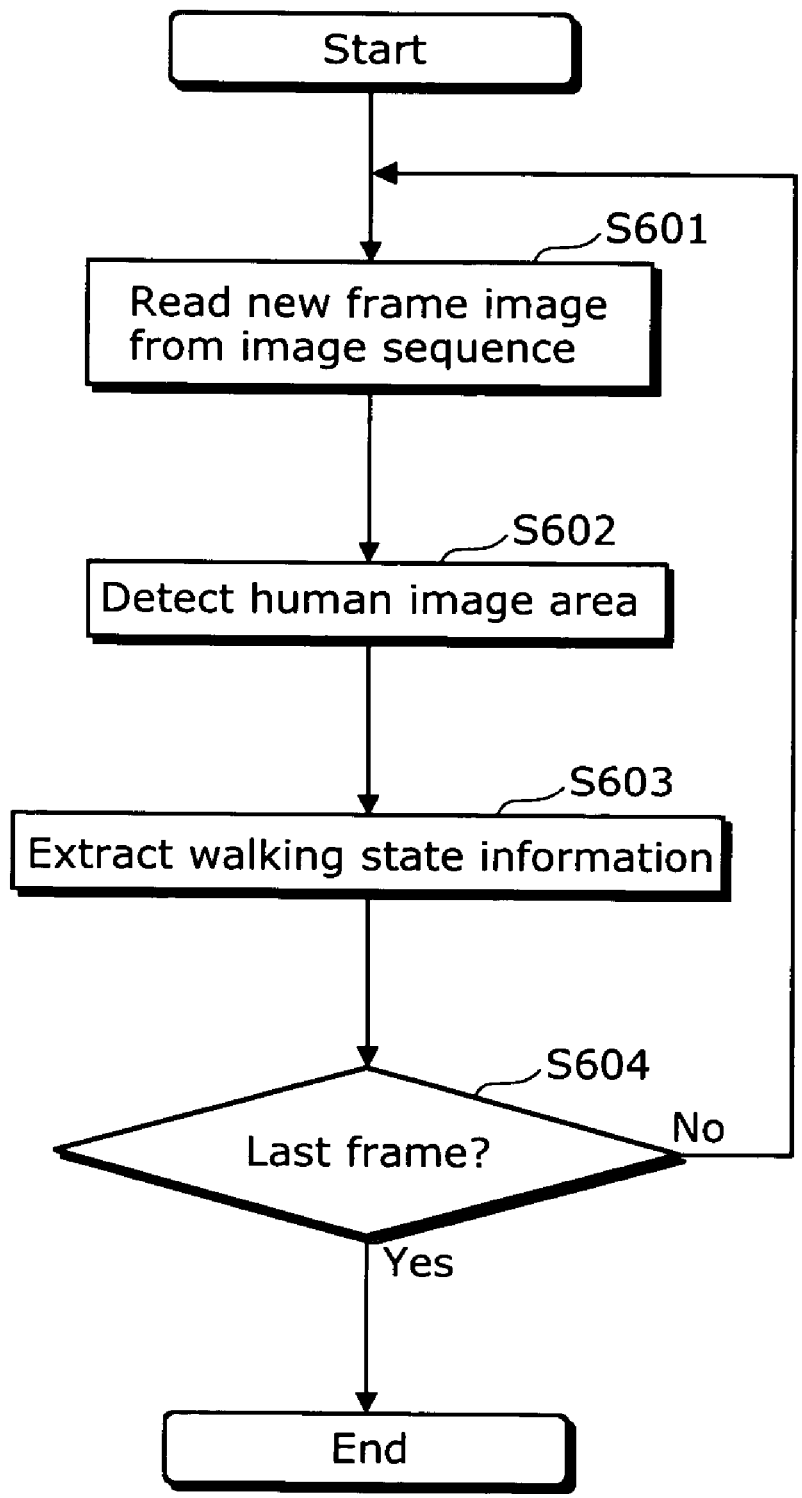
FIG. 14 is a flowchart showing an example of a procedure for extracting a walking sequence, according to the first embodiment of the present invention.

An example of the extraction of a walking sequence performed by the walking sequence extracting unit 110 will be described with reference to FIG. 14. Firstly, the walking sequence extracting unit 110 reads one frame image from the image sequence (Step S601). A frame image is read from among the unread frame images in time order. The walking sequence extracting unit 110 then detects a human image area from the read-out frame image (Step S602). For the detection of a human image area, method such as inter-frame difference method that is generally used for detecting a moving object and a difference background method for calculating a difference between the human image area and a previously-provided background image which does not include any human images. Even in the case of using still pictures, a template image of human may be prepared so that it is possible to detect a human image by extracting an area with high similarity to the template image, using similarity calculation (a template matching method such as a simple difference calculation and a normalization correlation calculation). The walking sequence extracting unit 110 then extracts, from the human image area, information indicating a walking state (Step S603). Such information indicating a walking state may be information indicating a transition of time for a walking state such as trace information, as shown in FIG. 4B, indicating a tracing of toes.

Note that Steps S602 and S603 may be simultaneously performed as a sequence of process or a result of processing Step S602 may be considered as a result of processing Step S603. Instead of extracting explicitly a whole human image area as in Step S602, processing may be executed so that an output of Step S603 can be directly obtained. For example, for the lower body image area as described above, the walking state information may be directly obtained using the template matching method where the lower body image is used as a template. The walking sequence extracting unit 110 eventually judges whether or not the frame image that has just been read is the last frame (Step S604), and ends the processing of extracting a walking sequence in the case where the image is the last frame, or returns to Step S601 in the case where the last frame image still remains to be read.

Next, the spatiotemporal period information extracting unit 120, the spatiotemporal phase information extracting unit 121 and the spatiotemporal position information extracting unit 122 respectively extracts spatiotemporal period information, spatiotemporal phase information and spatiotemporal position information, based on the walking sequence 1 obtained in Step S402 (Step S403).

An example of the extraction of the three types of information described above based on the walking sequence shown in FIG. 4B will be described with reference to FIGS. 15 and 16A through 16C.

Figure 16A:
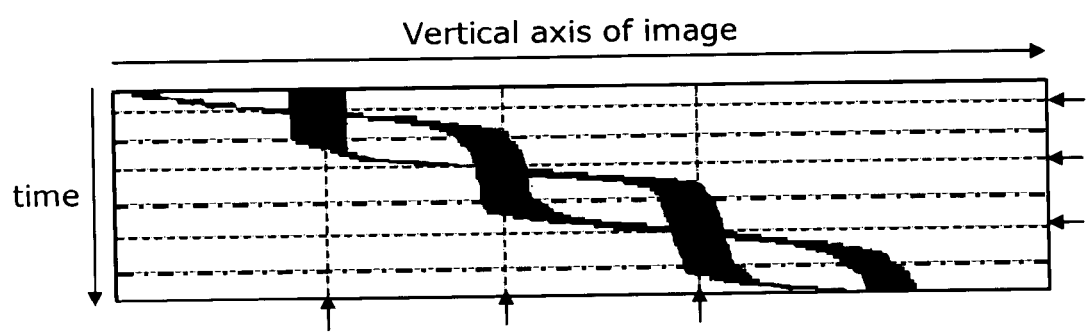
FIG. 16A shows an example of a detection of a specific walking state, according to the first embodiment of the present invention.
Figure 16B:
FIG. 16B shows an example of a template for detecting the specific walking state, according to the first embodiment of the present invention.
Figure 16C:
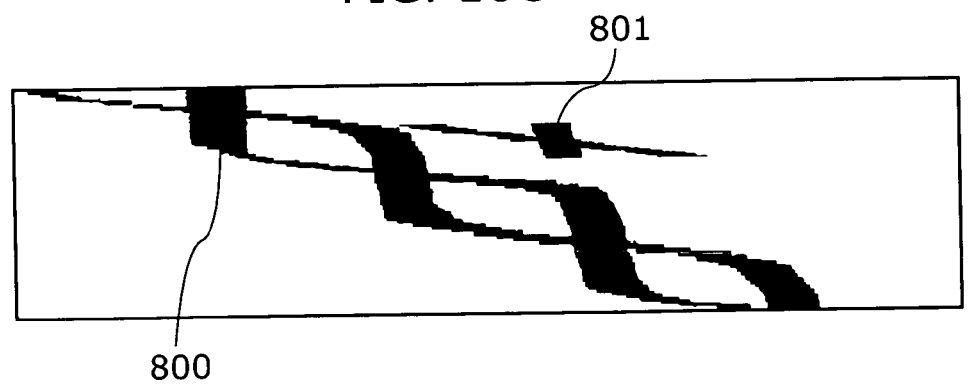
FIG. 16C shows an example of a process for detecting the specific walking state, according to the first embodiment of the present invention.

Firstly, the spatiotemporal period information extracting unit 120 and others detect a position of a specific walking state based on the walking sequence information (Step S701). The description of the specific walking state will be described with reference to FIGS. 16A through 16C. FIG. 16A shows a result of the detection of a specific walking state with respect to the walking sequence shown in FIG. 4B. Two black wave-like bands, shown in FIG. 16A, which cross with each other show a temporal trace of moving the toes. A horizontal axis presents a position of an image in a horizontal direction whereas a vertical line presents time. A specific walking state position is defined as a position at which the two bands cross the legs are crossed, namely, a position indicating a state in which the legs are crossed (a position indicated by respective dashed lines in the diagram). The crossing point can be detected by performing template matching or correlation operation using form patterns of the crossing section as shown in FIG. 16B which are provided beforehand. An example of the detecting process is shown in FIG. 16C. In FIG. 16C, a degree of matching in form is calculated by shifting a position of a detection template 801 with respect to a walking trace 800. When a value indicating a predetermined value or greater is obtained for the degree of matching in the verification, the walking trace 800 is determined to be the specific walking state. Thus, the crossing points of dashed lines, as shown in FIG. 16A, can be obtained.

Note that the specific walking state is not restricted to the state in which the legs are crossed, and a state in which the legs are widened the most may be set as the specific walking state. Such state, in the walking trace shown in FIG. 16A, is a position at which a gap between the two bands is the widest (as indicated by respective dash-dot lines in the diagram). Step S701 is performed until all the specific walking states are detected, and the process goes on to Step S703 after that (Step S702).

The spatiotemporal period information extracting unit 120 then generates spatiotemporal period information by calculating an interval between the detected specific walking state positions (Step 703). The period information may be derived separately without obtaining such specific walking state positions, using the methods such as a Fourier transform, a wavelet transform and an auto-correlation method. In this case, these methods can be applied to a temporal change in a position of the wave-like bands shown in FIG. 16A or a spatiotemporal change in a gap between the two bands. As for the spatiotemporal period information, a form of the smallest unit of a periodic walking trace, as shown in FIG. 16A, may be used as a pattern. In such case, one wave form made up of two bands within the range sectioned by horizontal and vertical dashed lines may be used as a pattern.

Then, the spatiotemporal phase information extracting unit 121 derives spatiotemporal phase information (Step S704). The spatiotemporal phase information represents an amount of spatiotemporal movement to a spatiotemporal position at which the legs are crossed (where a specific walking state appears) for the first time after a reference spatiotemporal position is passed. In the case of using, as the spatiotemporal phase information, a time or a position at/in which a predetermined posture is taken, a time or a position at/in which a stride length becomes the shortest is defined, in FIG. 7B, to be such spatiotemporal phase information. Thus, for a walking 1902a, a value 1905 derived based on an estimated walking state 1903a is defined as temporal phase information or spatial phase information, whereas for a walking 1901a, a value 1906 is defined to be such phase information. In the case of using a posture at a predetermined time or position, as the spatiotemporal phase information, a value 1904 (a value indicative of stride length) of an estimated walking state 1903a is defined, for the walking 1902a, as temporal phase information or spatial phase information, while the value 1904 is defined for the walking 1901a as such phase information.

Looking at an example shown in FIG. 5, in the case of setting an upper left corner of the walking trace graph to be a reference temporal axis, a time between the upper left corner and a position at which the legs are crossed for the first time (a crossing point of the dashed lines) becomes the temporal phase information. Also, in the case of setting a vertical line A013 as a reference spatial position, a gap between the vertical line A013 and the position, which is the nearest to the vertical line A013 on the right side of the line A013 and at which the legs are crossed, becomes the spatial phase information. The way of representing such movement amount is not limited to the above examples, and the amount may be presented in a relative size based on a time required for a sequence of one step and its movement amount.

It should be noted that the spatiotemporal phase information means phase information indicating an appearance of a specific walking state within an image, so that even in the case where the walking sequences have the same spatiotemporal period, different values may be obtained for the walking patterns whose spatiotemporal timings in a state of putting down a foot on the ground or crossing the legs are different. In FIG. 5, the walking sequences A011 and A012 have the same spatiotemporal period of walking, however, the spatiotemporal phase information as defined above respectively indicates a different value.

Next, the spatiotemporal position information extracting unit 122 derives spatiotemporal position information (Step S705). The spatiotemporal position information is defined as a time and a position in image in which the first specific walking state is detected. The spatiotemporal position information is information indicating an absolute spatiotemporal position coordinate of the detected position of the specific walking state, and a position at which the second step is detected or a position at which the last step is detected may be used instead.

By detecting a specific walking state, it is possible to obtain not only spatiotemporal period information of the walking but also its spatiotemporal phase information and spatiotemporal position information.

The spatiotemporal period information, the spatiotemporal phase information and the spatiotemporal position information thus obtained in Step 403 are respectively stored into the spatiotemporal period information storing unit 130, the spatiotemporal phase information storing unit 131 and the spatiotemporal position information storing unit 132 (Step S404).

Then, the image sequence receiving unit 100 obtains an image sequence 2 for searching a person, as in Step S401 (Step S405). The walking sequence extracting unit 110 extracts a walking sequence 2 from the image sequence 2 (Step S406). The image sequence receiving unit 100 then judges whether or not another walking sequence can be found, as a result of Step S406 (Step S407). In the case where no sequence is found (No in Step S407), the walking sequence extracting unit 110 ends the processing. In the case otherwise (Yes in Step S407), the spatiotemporal period information extracting unit 120, the spatiotemporal phase information extracting unit 121 and the spatiotemporal position information extracting unit 122 extract, as in the case of the walking sequence 1, spatiotemporal period information, spatiotemporal phase information and spatiotemporal position information, from the walking sequence 2 (Step S408).

The spatiotemporal period verifying unit 140, the spatiotemporal phase verifying unit 141 and the spatiotemporal difference extracting unit 142 respectively verify between the spatiotemporal period information, the spatiotemporal phase information and the spatiotemporal position information of the walking sequence 1 which are stored in Step S404 and the spatiotemporal period information, the spatiotemporal phase information and the spatiotemporal position information extracted in Step 408 (Step S409). All the three types of information may be used or either of the spatiotemporal period information and the spatiotemporal phase information may be used for the verification.

A reference degree of matching may be pre-set for the respective three types of information, and in the case where all the three information satisfy the reference degree, it may be judged that the sequences match with each other. For example, in comparing the sequences of different expressions as shown in FIG. 9, in the case where the following equations are both satisfied: $|x1-x3|=D_x<\theta_x$; and $|y1-y3|=D_y<\theta_y$, where each spatiotemporal period information is expressed as (x1, y1) and (x3, y3), it is judged that the sequences match with each other. Here, $\theta_x$ and $\theta_y$ are predetermined thresholds. Similarly, in the case where the following equations are satisfied: $|w1-w3|=D_w<\theta_w$; and $|z1-z3|=D_z<\theta_z$, where each spatiotemporal phase information is expressed as (w1, z1) and (w3, z3), it is judged that the sequences match with each other. Here again, $\theta_w$ and $\theta_z$ are predetermined thresholds. In the case where the following equations are satisfied: $\|t1-t3\|=D_t<\theta_t$; and $(xx1-xx3)*(xx1-xx3)+(yy1-yy3)*(yy1-yy3)=D_{xy}<\theta_d$, where each spatiotemporal position information is expressed as t1, (xx1, yy1) and t3, (xx3, yy3), it is judged that the sequences match with each other. Here, $\theta_t$ and $\theta_d$ are predetermined thresholds.

The three types of information described above may be associated with each other for judging the verification. For example, each sum or product of the differences $D_x$ and $D_y$ in spatiotemporal period information, of the differences $D_w$ and $D_z$ in spatiotemporal phase information and of the differences $D_t$ and $D_{xy}$ in spatiotemporal position information may be compared with the predetermined reference degree of matching. For example, in the case where $(D_x+D_y+D_w+D_z+D_t+D_{xy})<\theta_{sum}$ and $(D_x \times D_y \times D_w \times D_z \times D_t \times D_{xy})<\theta_{mul}$ are both satisfied, it is judged that the sequences match with each other. Here, $\theta_{mul}$ is a predetermined threshold. The reference that is set for a difference in spatiotemporal period information and a difference in spatiotemporal phase information may be changed based on the difference in spatiotemporal position information. A difference in spatiotemporal position information gets larger since a value indicating spatiotemporal period and a value indicating spatiotemporal phase can vary as the spatiotemporal difference gets larger. Therefore, by reducing, as the difference in spatiotemporal position information increases, the reference references of matching for the difference in spatiotemporal period information and the difference in spatiotemporal phase information, it is possible to decrease the number of undetected sequences. For example, the differences $D_t$ and $D_{xy}$ in spatiotemporal position information satisfies $D_t>\theta_t$ or $D_{xy}>\theta_{xy}$, the thresholds $\theta_x$, $\theta_y$, $\theta_w$ and $\theta_z$ are multiplied by $\alpha$ ($\alpha$ is a constant indicating 0 or greater) for judging the verification.

In the case of using spatiotemporal period information, a value indicating the spatiotemporal period information does not easily change although a direction in which a person faces with respect to a camera changes, it is effective in that a search or tracking can be easily carried out between the temporally-distant image sequences.

In the case of using spatiotemporal phase information, it is effective in that it is easy to distinguish the walking sequences of different persons, having the similar spatiotemporal period.

Figure 17:
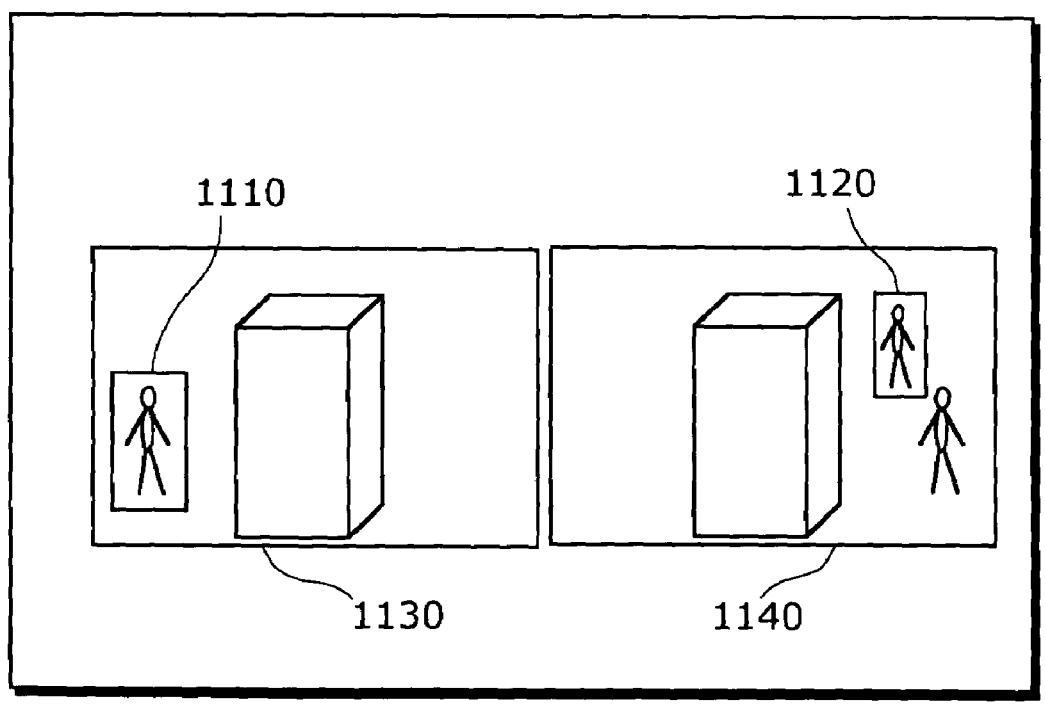
FIG. 17 shows an example of a display performed by a control unit according to the first embodiment of the present invention.

Then, the matching judging unit 150 judges whether or not the walking sequence 1 matches the walking sequence 2, based on the result of the verification performed in Step S409 (Step S410). In the case where the sequences do not match with each other (No in Step S410), the matching judging unit 150 returns to Step S406 and obtains a new walking sequence (Step S406). In the case where the sequences match with each other (Yes in Step S410), the control unit 160 displays the image sequence 1 and the image sequence 2 on the display apparatus 1060, and also displays, in a highlighted manner, the human image areas of the respective matched walking sequences. In FIG. 17, the image sequence 1 is displayed in an area 1130 and the image sequence 2 is displayed in an area 1140, while the human image areas in the respective matched walking sequences are displayed, in a highlighted manner, using circumscribed rectangles 1110 and 1120.

The spatiotemporal period information (i.e. walking pattern), in general, changes subjected to various elements such as personal habits (e.g. walking habit), individual circumstances (e.g. in a hurry, walking slowly), a type of footwear (e.g. a height of heel, and a movable range of ankle), belongings (e.g. whether something heavy is carried in the hand), clothes (e.g. a movable range of legs) and road surface conditions (e.g. slipperiness and slope). It is therefore difficult to identify an individual based on the spatiotemporal period information. By deriving a difference in spatiotemporal position between the two walking sequences to be verified, using the spatiotemporal position information, and allowing the reference degree of matching, which is used for judging whether or not the sequences match with each other, to vary depending on the difference in spatiotemporal position, it is possible to reflect, in the verification, the degree at which a place or a footwear, clothes and belongings may spatiotemporally vary, so as to prevent wrong verification. As in the examples shown in FIGS. 13A and 13B, when a spatiotemporal difference is no more than ten seconds, a walking sequence with smaller differences in both spatiotemporal period information and spatiotemporal phase information may only be searched for or tracked. For example, when $D_t$ is shorter than ten seconds, the thresholds $\theta_x$, $\theta_y$, $\theta_w$ and $\theta_z$ are multiplied by $\beta$ ($\beta$ is a constant less than 1.0) for judging the matching between sequences. With the method as described above, it is possible to appropriately select for a person 502 in the image sequence shown in FIG. 13A, between the two persons in the image sequence shown in FIG. 13B, a person 503 whose information about the walking sequence corresponds to the information about the walking sequence of the person 502.

As has been described so far, according to the embodiment, by detecting the spatiotemporal period information, the spatiotemporal phase information and the spatiotemporal position information obtained from a walking sequence, and judging whether the walking sequence matches a different walking sequence, based on the information, it is possible to search/track, with less influence by the size of a human image and a direction in which the human image faces in an image, a person presented by the human image included in an image sequence obtained at a different time.

It should be noted that, in the embodiment, the matching of walking sequences is performed using both the spatiotemporal period information and the spatiotemporal phase information, however, it is possible to see if the walking sequences match with each other by using one of the above information, and thus it is possible to obtain the same effect as can be obtained with the present invention. With the combination of the both information, it is possible to perform more sophisticated verification and thereby to improve accuracy in a search or tracking.

Also, it is desirable that an image sequence to be received by the image sequence receiving unit 100 be a time length which includes a walking distance of at least one step or the number of frames, since the improvement of the verification accuracy can be expected when the number of steps is greater than one. As such time length, it is also preferable that an image sequence last a half second or longer (i.e. 15 frames or more, as based on 30 frames per second), and that a specific walking state be detected two times or more.

It should be also noted that the first embodiment described the example of obtaining an image sequence directly from a camera, however, the same effect can be obtained by reading out an image sequence stored in the storing apparatus 1040 or the like.

Second Embodiment

Figure 18A:
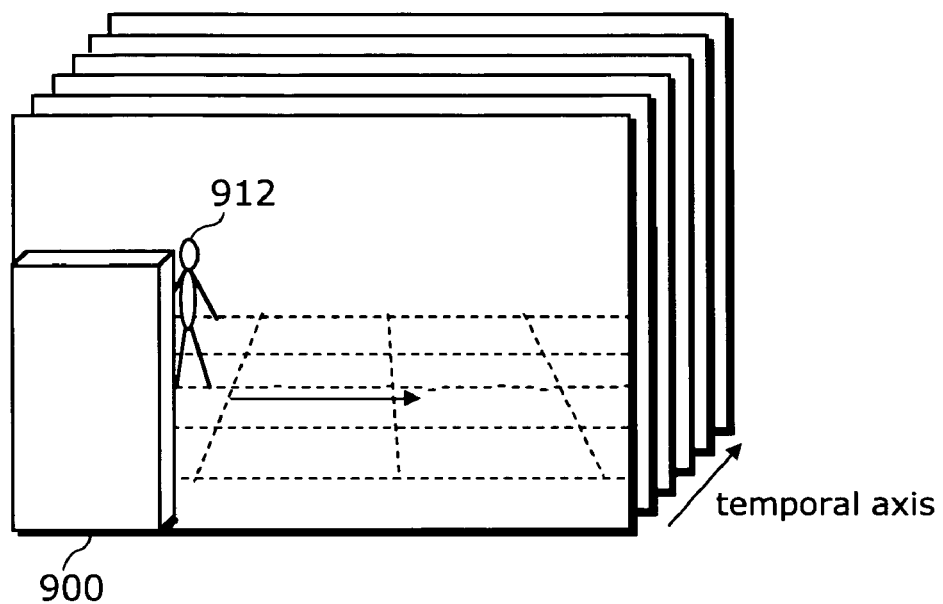
FIG. 18A shows an example of an image sequence 1 according to a second embodiment of the present invention.
Figure 18B:
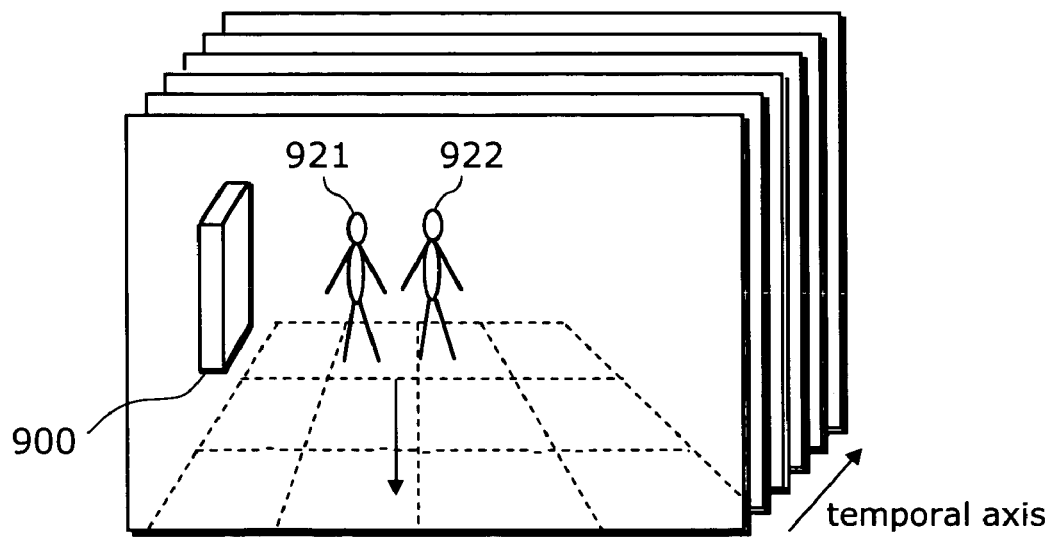
FIG. 18B shows an example of an image sequence 2 according to the second embodiment of the present invention.
Figure 19:
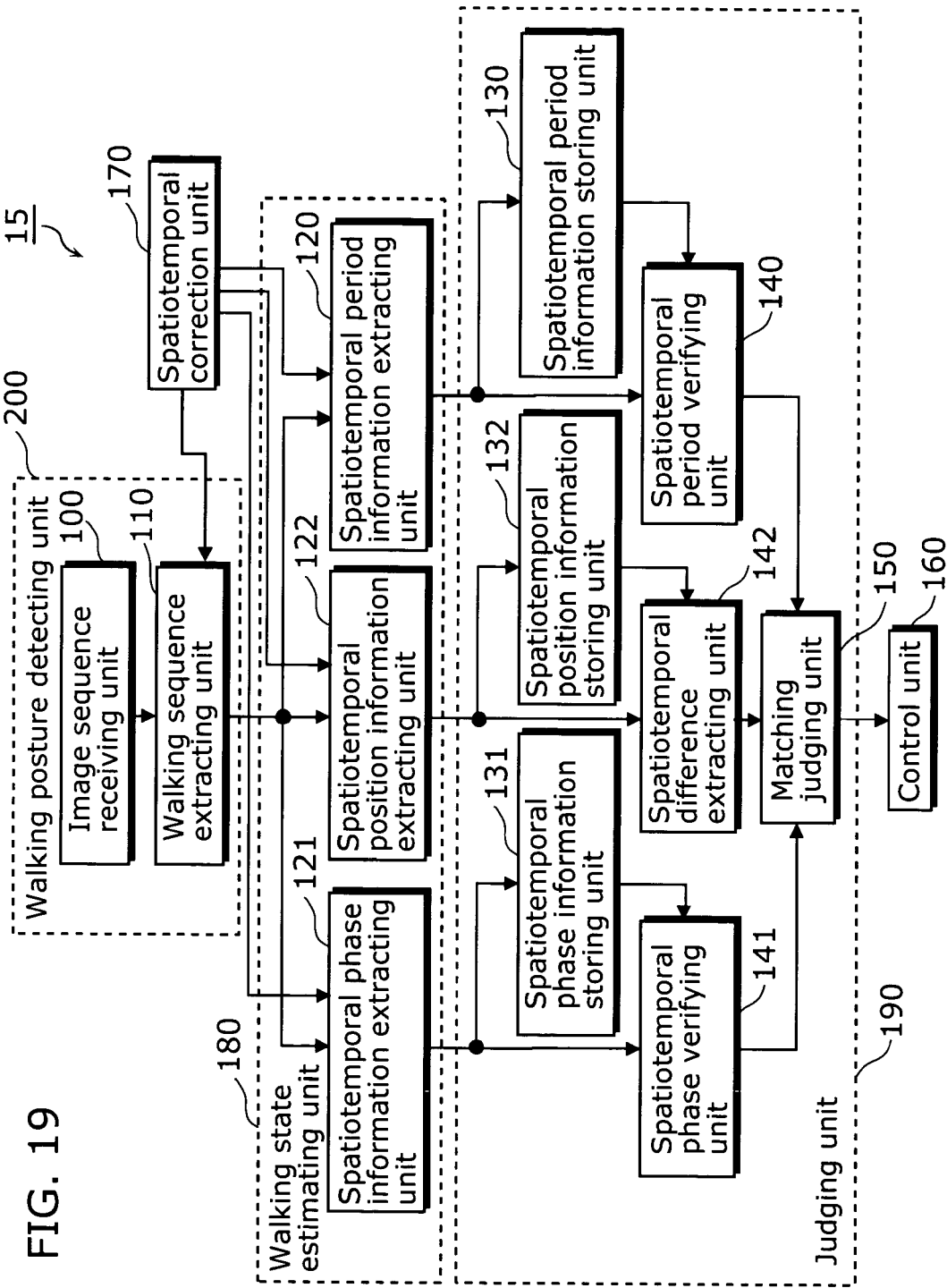
FIG. 19 shows a functional block showing a structure of the human identification apparatus according to the second embodiment of the present invention.

The following describes the second embodiment with reference to FIGS. 18A, 18B and 19.

The structure of the human identification apparatus according to the second embodiment is basically the same as the one described in the first embodiment, however, the present apparatus searches for or tracks a person, using image sequences obtained by two different cameras, as an image sequence 1 and an image sequence 2 respectively. FIGS. 18A and 18B show examples of images. FIG. 18A shows the image sequence 1 while FIG. 18B shows the image sequence 2. In the respective image sequences 1 and 2, an obstacle 900 is displayed in the form of cuboid. In the image sequence 1 shown in FIG. 18A, a person 922 is hidden by the obstacle 900 and only a person 912 is presented. In the image sequence 2 shown in FIG. 18B, a person 921 and the person 922 are presented. The person 912 corresponds to the person 922, having the same height and the same clothes, however, in the image sequence 2, the persons 921 and 922 are walking closely to each other so that it is difficult to distinguish whether the person corresponding to the person 912 is the person 921 or the person 922 based on color, texture and motion vector. As shown in FIGS. 18A and 18B, the ground is displayed in a lattice-like design using dashed lines for indicating a position coordinate to be used for verification between respective position information of the two image sequences. The lattice form in dashed lines can be obtained by an actual measurement of correspondence (spatiotemporal correction information) between a position within a camera screen and a position in a shooting location or by geometric calculation based on camera placement and optical specification. The lattice shown in FIG. 18A and the lattice shown in FIG. 18B present positions to be corresponded. Such coordinate conversion between corresponding points on different planes within the image can be represented in a homography H, therefore, the matrix H shall be calculated and held. As for the method of deriving such homography H, the conventional method, as introduced in "Optimal homography computation with a reliability measure" in IEICE Transactions on Information and Systems written by K. Kanatani, N. Ohta and Y. Kanazawa, Vol. E83-D, No. 7, pp. 1369-1374 (July 2000), may be used.

FIG. 19 is a function block diagram showing a structure of a human identification apparatus 15 according to the second embodiment. The human identification apparatus 15 includes a spatiotemporal correction unit 170 in addition to the components included in the human identification apparatus 10 according to the first embodiment. The spatiotemporal correction unit 170 is a processing unit which corrects spatiotemporal discordance between different image sequences using spatiotemporal correction information, when extracting a walking sequence or deriving spatiotemporal period information, spatiotemporal phase information and spatiotemporal position information. The spatiotemporal correction unit 170 is an example of a correction unit which performs spatiotemporal correction in the extraction of gait information.

The human image judging unit 15 can process, in the same manner as described in the first embodiment, a video taken by a different camera, so as to identify, in the image sequence 2, a human image corresponding to the human image included in the image sequence 1. A location of a target object within an image differs due to the difference in placement of camera, therefore, grid lines, as spatiotemporal correction information, is previously held for each camera (or each image sequence) so that the grid lines can be used as correction information of spatial position coordinate for the extraction of a walking sequence. That is to say, the spatiotemporal correction unit 170 holds, as correction information, information which specifies grid lines that two-dimensionally sections at regular intervals, a surface on which a person walks in a shooting location.

By performing correction using the spatiotemporal correction information, the spatiotemporal correction unit 170 can verify spatiotemporal period information, spatiotemporal phase information and spatiotemporal position information between the images taken by different cameras. For example, the spatiotemporal correction unit 170 spatiotemporally corrects the spatiotemporal period information, the spatiotemporal phase information and the spatiotemporal position information according to ratios of each side and dimension of a small area sectioned by the grid lines (i.e. multiply by a proportional factor). The spatiotemporal position, at which a person is in a state of taking a specific walking posture for the first time after passing a specific grid line, may be used as the spatiotemporal phase information. With such structure, it is possible to identify a person (not shown) hidden behind the obstacle 900 with the person 921, and also, the person 921 with the person 922.

In the above example, a correspondence of the positions is used for extracting a walking sequence; however, an image in one image sequence may be converted before other processing so that a position of the image in one image sequence corresponds to a position of an image in the other image sequence. For the image conversion, by applying the homography H as described above to a pixel position on the planar surface (i.e. ground) on which a human image walks, it is possible to convert the pixel position into a position on a planar surface (i.e. ground) within the other corresponding image sequence. Therefore, an image can be converted by performing conversion for all the pixels in the same way. By deriving the spatiotemporal period information, the spatiotemporal phase information and the spatiotemporal position information after the correction using positional relationship, it is possible to correspond different walking sequences without being affected by the placement of camera.

Even in the case where frame rates are different between two image sequences, it is possible to search for or track a person over image sequences of different frame rates by one of the following operations performed by the spatiotemporal correction unit 170: performing, in advance, frame rate conversion to the frame rate of one image sequence so that the image sequences have the same frame rate; performing such frame rate conversion at the time of extracting a walking sequence; and correcting time information when deriving spatiotemporal period information, spatiotemporal phase information and spatiotemporal position information. For example, in the case where a frame rate of one image sequence is 15 frames per second while a frame rate of the other image sequence is 30 frames per second, a frame is taken out for every two frames from the latter image sequence so as to generate an image sequence at the frame rate of 15 frames per second, and then, detection of walking sequences and verification of the walking sequences between the image sequences are performed.

In the case above, spatiotemporal correction information of frame rate necessary for correction may be previously held in association with each image sequence, in a storing apparatus or the like.

Generally speaking, when a person is shot by different cameras, how the person looks like in an image greatly differs, in many cases, due to difference in a direction in which the person faces, lighting conditions and characteristics of a camera. It is therefore difficult to appropriately search for or track the person with the tracking method using colors, a continuity of motion vectors, and image patterns of human image area. However, by using the method according to the embodiment, it is possible to search for or track a person presented by the human images included in different image sequences, using the spatiotemporal period information and the spatiotemporal phase information obtained from a walking sequence of the person, even in the case where the human image to be judged is presented by a different color, or faces toward a different direction or has a different appearance compared to the person to be searched for or tracked. In particular, in the case where fields taken by different cameras include the same location, and the same person may be shot from different angles, it is possible to effectively correspond the different human sequences using spatiotemporal phase information.

Note that, in the above example, a correspondence of positions between the images taken by different cameras is made beforehand, however, in the case of mainly using time period and time phase, it is possible, without such correspondence, to verify between the walking sequences so as to obtain the same effect as can be obtained with the present invention.

It should be noted that part or all of the processing described in the above embodiments may be executed by a device intended for such processing, or by a communication device such as a terminal and a base station, or a CPU incorporated in a computer, which executes a program.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be used as a human identification apparatus which judges whether or not human images included in different image sequences represent the same person, and as a human searching/tracking apparatus which searches for or tracks a person in image sequences, e.g., a monitor system that is set up on the street, or the like.

What is claimed is:

1. A human identification apparatus which judges whether or not persons represented by human images respectively included in different image sequences are the same person, said apparatus comprising:

an image sequence receiving unit operable to receive inputs of a first image sequence, and a second image sequence which is obtained in one of the following manners: at a time different from a time when the first image sequence is obtained; and by an image sensor different from an image sensor used for obtaining the first image sequence;

a walking sequence extracting unit operable to extract, from the respective received first and second image sequences, first and second walking sequences, each sequence being an image sequence indicating a walking state of a person;

a gait information extracting unit operable to extract, from the respective received first and second walking sequences, first spatiotemporal period information and first spatiotemporal phase information as first gait information, and second spatiotemporal period information and second spatiotemporal phase information as second gait information, the spatiotemporal period information indicating a temporal or spatial walking period of a person, the spatiotemporal phase information indicating a temporal or spatial phase information in a periodic walking movement of a person, and the gait information specifying a periodic motion in human gait;

a gait information verifying unit operable to verify between the first gait information and the second gait information by comparing times or positions at/in which the persons represented by the human images respectively included in the first and second image sequences take a predetermined walking posture, based on the first and second spatiotemporal phase information respectively included in the extracted first and second gait information; and a judging unit operable to judge whether or not the person represented by the human image included in the first image sequence and the person represented by the human image included in the second image sequence are the same person, based on a result of the verification performed by said gait information verifying unit, wherein said gait information verifying unit includes:

a phase information estimating unit operable to estimate, for the human image included in the first image sequence, spatiotemporal phase information at a time or in a position that is different from a time or a position of the first image sequence, based on the first spatiotemporal phase information included in the first gait information; and a gait information verifying unit operable to verify between the first gait information and the second gait information by comparing times or positions at/in which the persons represented by the human images respectively included in the first and second image sequences take a predetermined walking posture, based on the spatiotemporal phase information estimated by said phase information estimating unit and the second spatiotemporal phase information.

2. A human identification apparatus which judges whether or not persons represented by human images respectively included in different image sequences are the same person, said apparatus comprising:

an image sequence receiving unit operable to receive inputs of a first image sequence, and a second image sequence which is obtained in one of the following manners: at a time different from a time when the first image sequence is obtained; and by an image sensor different from an image sensor used for obtaining the first image sequence;

a walking sequence extracting unit operable to extract, from the respective received first and second image sequences, first and second walking sequences, each sequence being an image sequence indicating a walking state of a person;

a gait information extracting unit operable to extract, from the respective received first and second walking sequences, first spatiotemporal period information and first spatiotemporal phase information as first gait information, and second spatiotemporal period information and second spatiotemporal phase information as second gait information, the spatiotemporal period information indicating a temporal or spatial walking period of a person, the spatiotemporal phase information indicating a temporal or spatial phase information in a periodic walking movement of a person, and the gait information specifying a periodic motion in human gait;

a gait information verifying unit operable to verify between the first gait information and the second gait information which have been extracted;

a judging unit operable to judge whether or not the person represented by the human image included in the first image sequence and the person represented by the human image included in the second image sequence are the same person, based on a result of the verification performed by said gait information verifying unit;

a correction information holding unit operable to previously hold correction information indicating a correlation between a position within an image of the respective first and second image sequences, and a position in a shooting location; and a correcting unit operable to make a spatiotemporal correction for the extraction of the respective first and second gait information, based on the correction information held in said correction information holding unit.

3. The human identification apparatus according to claim 2, wherein said correction information holding unit is operable to hold, as the correction information, information which specifies grid lines for two-dimensionally sectioning, at regular intervals, a surface on which a person walks in the shooting location.

4. A human searching or tracking apparatus which searches or tracks specific persons represented by human images included in image sequences, said apparatus comprising:

(i) a human identification apparatus including:

an image sequence receiving unit operable to receive inputs of a first image sequence, and a second image sequence which is obtained in one of the following manners: at a time different from a time when the first image sequence is obtained; and by an image sensor different from an image sensor used for obtaining the first image sequence;

a walking sequence extracting unit operable to extract, from the respective received first and second image sequences, first and second walking sequences, each sequence being an image sequence indicating a walking state of a person;

a gait information extracting unit operable to extract, from the respective received first and second walking sequences, first spatiotemporal period information and first spatiotemporal phase information as first gait information, and second spatiotemporal period information and second spatiotemporal phase information as second gait information, the spatiotemporal period information indicating a temporal or spatial walking period of a person, the spatiotemporal phase information indicating a temporal or spatial phase information in a periodic walking movement of a person, and the gait information specifying a periodic motion in human gait;

a gait information verifying unit operable to verify between the first gait information and the second gait information which have been extracted; and a judging unit operable to judge whether or not persons represented by human images respectively included in the first image sequence and the second image sequence are the same person, based on a result of the verification performed by said gait information verifying unit; and (ii) a walking sequence storing unit operable to store, in an associated manner, the first and second walking sequences respectively corresponding to first and second gait information, in the case where said gait information verifying unit of said human identification apparatus verifies that the first gait information matches the second gait information.

5. A human searching or tracking apparatus which searches or tracks specific persons represented by human images included in image sequences, said apparatus comprising:

(i) a human identification apparatus including:

an image sequence receiving unit operable to receive inputs of a first image sequence, and a second image sequence which is obtained in one of the following manners: at a time different from a time when the first image sequence is obtained; and by an image sensor different from an image sensor used for obtaining the first image sequence;

a walking sequence extracting unit operable to extract, from the respective received first and second image sequences, first and second walking sequences, each sequence being an image sequence indicating a walking state of a person;

a gait information extracting unit operable to extract, from the respective received first and second walking sequences, first spatiotemporal period information and first spatiotemporal phase information as first gait information, and second spatiotemporal period information and second spatiotemporal phase information as second gait information, the spatiotemporal period information indicating a temporal or spatial walking period of a person, the spatiotemporal phase information indicating a temporal or spatial phase information in a periodic walking movement of a person, and the gait information specifying a periodic motion in human gait;

a gait information verifying unit operable to verify between the first gait information and the second gait information which have been extracted; and a judging unit operable to judge whether or not persons represented by human images respectively included in the first image sequence and the second image sequence are the same person, based on a result of the verification performed by said gait information verifying unit; and (ii) a display unit operable to display the first and second image sequences received by the image sequence input unit of said human identification apparatus, wherein the display unit displays, in a highlighted manner, the human images judged by said judging unit of said human identification apparatus to represent the same person, so that the identified human images are distinguished from the other human images, the identified human images being identified from among the human images included in the first and second image sequences.

* * * * *